United States Patent
Deogun et al.

(10) Patent No.: US 11,438,897 B2
(45) Date of Patent: Sep. 6, 2022

(54) METHOD AND USER EQUIPMENT (UE) FOR BEAM MANAGEMENT FRAMEWORK FOR CARRIER AGGREGATION

(71) Applicant: Samsung Electronics Co., Ltd., Suwon-si (KR)

(72) Inventors: Pravjyot Singh Deogun, Bengaluru (IN); Saidhiraj Amuru, Bengaluru (IN); Jae-Won Kim, Seoul (KR); Anshuman Nigam, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 62 days.

(21) Appl. No.: 16/636,563

(22) PCT Filed: Aug. 3, 2018

(86) PCT No.: PCT/KR2018/008864
§ 371 (c)(1),
(2) Date: Feb. 4, 2020

(87) PCT Pub. No.: WO2019/027294
PCT Pub. Date: Feb. 7, 2019

(65) Prior Publication Data
US 2020/0404638 A1   Dec. 24, 2020

(30) Foreign Application Priority Data

Aug. 4, 2017 (IN) .............................. 201741027798
Jul. 23, 2018 (IN) .............................. 201741027798

(51) Int. Cl.
*H04W 72/04* (2009.01)
*H04B 7/06* (2006.01)
(Continued)

(52) U.S. Cl.
CPC ........ *H04W 72/046* (2013.01); *H04B 7/0617* (2013.01); *H04B 7/0626* (2013.01); *H04L 5/0053* (2013.01); *H04W 24/10* (2013.01)

(58) Field of Classification Search
CPC ... H04W 72/046; H04W 24/10; H04W 76/15; H04W 76/19; H04W 24/02;
(Continued)

(56) References Cited

U.S. PATENT DOCUMENTS

2013/0223251 A1   8/2013 Li et al.
2014/0204897 A1*  7/2014 Takeda ................ H04W 72/042
                                              370/329

(Continued)

OTHER PUBLICATIONS

3GPP TSG RAN WG1 Meeting #89, May 19, 2017 (Year: 2017).*
(Continued)

*Primary Examiner* — Hardikkumar D Patel

(57) ABSTRACT

Embodiments herein provides User Equipment (UE) providing beam management and method for beam recovery and beam management to be executed by the UE. The method for beam management comprises a beam failure detection, a beam reporting and a beam recovery. The present disclosure provides one or more methods for performing beam management and beam recovery when the UE is operating in multiple carriers.

15 Claims, 20 Drawing Sheets

(51) Int. Cl.
 *H04L 5/00* (2006.01)
 *H04W 24/10* (2009.01)
(58) Field of Classification Search
 CPC .. H04B 7/0617; H04B 7/0626; H04B 7/0695; H04L 5/0053; H04L 5/0023; H04L 5/0048; H04L 5/001; H04L 5/0032; H04L 5/0091
 See application file for complete search history.

(56) References Cited

U.S. PATENT DOCUMENTS

| | | | |
|---|---|---|---|
| 2017/0026938 A1 | 1/2017 | Onggosanusi et al. | |
| 2018/0192443 A1* | 7/2018 | Novlan | H04W 74/0833 |
| 2019/0037498 A1* | 1/2019 | Tseng | H04W 72/0413 |
| 2019/0230569 A1* | 7/2019 | Kim | H04W 88/16 |
| 2019/0297560 A1* | 9/2019 | Gao | H04W 72/044 |
| 2020/0120704 A1* | 4/2020 | Wang | H04L 5/0091 |
| 2020/0186218 A1* | 6/2020 | Wu | H04L 5/0048 |

OTHER PUBLICATIONS

Examination report dated Dec. 1, 2020 in connection with Indian Application No. 201741027798, 6 pages.
ISA/KR, International Search Report and Written Opinion of the International Searching Authority, International Application No. PCT/KR2018/008864, dated Nov. 8, 2018, 7 pages.
AT&T, "Design principles of beam recovery mechanism," R1-1707751, 3GPP TSG RAN WG1 Meeting #88bis, Spokane, USA, Apr. 3-7, 2017, 3 pages.
Spreadtrum Communications, "Discussion on UE initiated recovery from beam failure," R1-1707782, 3GPP TSG RAN WG1 Meeting #89, Hangzhou, P R. China, May 15-19, 2017, 5 pages.
Vivo, "Beam recovery based on NR-PDCCH and NR-PDSCH," R1-1707245, 3GPP TSG RAN WG1 Meeting #89, Hangzhou, P.R. China, May 15-19, 2017, 6 pages.
ZTE, "Discussion on beam recovery mechanism," R1-1707121, 3GPP TSG RAN WG1 Meeting #89, Hangzhou, P.R. China, May 15-19, 2017, 8 pages.
Huawei, HiSilicon, "RAN2 aspects of DL beam management", 3GPP TSG-RAN WG2 Meeting NR#2, Jun. 27-29, 2017, R2-1706718, 4 pages.
Huawei, HiSilicon, "RLF for NR", 3GPP TSG-RAN WG2-NR Adhoc#2, Jun. 27-29, 2017, R2-1706745, 7 pages.
Supplementary Partial European Search Report dated Apr. 24, 2020 in connection with European Patent Application No. 18 84 0795, 12 pages.
ZTE, "Discussion on beam recovery mechanism", 3GPP TSG RAN WG1 Meeting #89, May 15-19, 2017, R1-1707121, 8 pages.
NTT Docomo, Inc., "Discussion on NR RLM and RLF", 3GPP TSG RAN WG1 Meeting #89, May 15-19, 2017, R1-1708446, 7 pages.
Supplementary European Search Report dated Aug. 17, 2020 in connection with European Patent Application No. 18 84 0795, 13 pages.

* cited by examiner

METHOD AND USER EQUIPMENT (UE) FOR BEAM MANAGEMENT FRAMEWORK FOR CARRIER AGGREGATION

CROSS-REFERENCE TO RELATED APPLICATIONS

This application is a National Phase Entry of PCT International Application No. PCT/KR2018/008864, which was filed on Aug. 3, 2018, and claims priority to Indian Provisional Patent Application No. 201741027798, which was filed on Aug. 4, 2017, and Indian Complete Patent Application No. 201741027798, which was filed on Jul. 23, 2018, the contents of which are incorporated herein by reference.

BACKGROUND

1. Field

The present disclosure in general relates to beam management framework, and more particularly to the beam management framework for secondary cells for User Equipment (UE) supporting carrier aggregation.

2. Description of Related Art

3GPP 5G cellular networks and User Equipment (UE) support each of a sub-6 GHz and above 6-GHz frequency spectrum. To support above-6 GHz frequencies, an essential requirement is to utilize beam forming procedures to extend a signal coverage of a cell. The beam forming procedures include beam management procedures. The beam management procedures comprise a beam failure detection, a beam reporting and a beam recovery.

Currently, the beam management procedures are defined by assuming only single carrier. However, for carrier aggregation framework, where UE may operate in multiple carriers, UE may have to perform multiple beam management procedures concurrently for different carriers. Given beam management procedures for secondary carriers may or may not be different as compared to the primary carrier.

SUMMARY

The present disclosure is to provide a mechanism for User Equipment (UE) to perform beam management procedures including beam measurement, beam reporting, beam recovery and beam failure for primary and secondary cell, thereby improving reliability and mobility performance of high frequency deployment.

The disclosure provides a method for providing beam management in a User Equipment (UE). The method comprises generating, by the UE, one or more beam measurement results for one or more beam measurement resources so configured on a secondary cell of one or more secondary cells and initiating, by the UE, a beam recovery procedure on the secondary cell, based on one or more predefined conditions associated with the secondary cell.

Accordingly, the disclosure provides a method for providing beam management in a User Equipment (UE). The method comprises generating, by the UE, one or more beam measurement results for one or more beam measurement resources so configured on a secondary cell of one or more secondary cells and transmitting, by the UE, one or more beam measurement reports corresponding to secondary cell, by using primary cell resources. The beam measurement reports are transmitted based on one or more predefined conditions.

Accordingly, the disclosure provides a method for providing beam management in a User Equipment (UE). The method comprises generating, by the UE, one or more beam measurement results for one or more beam measurement resources so configured on a secondary cell and performing, by the UE, a beam recovery on a secondary cell based on a command received from a network. The beam recovery is performed based on an indication provided by the network.

Accordingly, the disclosure provides a method for providing beam recovery in a User Equipment (UE). The method comprises transmitting, by the UE, a beam recovery request using a beam recovery request resource on the cell where beam recovery is triggered. The beam recovery request comprises an identity of a candidate beam of a secondary cell. The method comprises selecting by the UE, one or more beams, for transmission of the beam recovery request to the network and monitoring, by the UE, a beam recovery response from the network, for a monitoring time duration, on a predefined response resource, and performing by the UE, a predefined action based on a reception of the beam recovery response. The predefined action is performed according to the monitoring time duration.

Accordingly, the disclosure provides a User Equipment for providing beam management in a cellular network. The UE comprises a transceiver and a processor coupled to the transceiver The processor is configured to generate, by the UE, one or more beam measurement results for one or more beam measurement resources so configured on a secondary cell and initiate, by the UE, a beam recovery on a secondary cell, based on one or more predefined conditions associated with the secondary cell.

Accordingly, the disclosure provides a User Equipment providing beam management in a cellular network. The UE comprises a transceiver and a processor coupled to the transceiver. The processor is configured to generate, by the UE, one or more beam measurement results for one or more beam measurement resources so configured on a secondary cell and transmit, by the UE, one or more beam reports corresponding to secondary cell, by using primary cell resources. The beam reports are transmitted based on one or more predefined conditions.

Accordingly, the disclosure provides a User Equipment for providing beam management in a cellular network. The UE comprises a transceiver and a processor coupled to the transceiver. The processor is configured to generate, by the UE, one or more beam measurement results for the one or more beam measurement resources so configured on a secondary cell and perform, by the UE, a beam recovery on a secondary cell based on a command received from a network. The beam recovery is performed based on an indication provided by the network.

Accordingly, the disclosure provides a User Equipment for providing beam recovery in a communication network. The UE comprises a transceiver and a processor coupled to the transceiver. The processor is configured to transmit, by the UE, a beam recovery request using a beam recovery request resource on the cell where beam recovery is triggered. The beam recovery request comprises an identity of a candidate beam of a secondary cell. The processor is further configured to select by the UE, one or more beams, for transmission of the beam recovery request to the network and monitor, by the UE, a beam recovery response from the network, for a monitoring time duration, on predefined response resources, and perform by the UE, a predefined action based on a reception of the beam recovery response. The predefined action is performed according to the monitoring time duration.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

BRIEF DESCRIPTION OF THE DRAWINGS

This disclosure is illustrated in the accompanying drawings, throughout which like reference letters indicate corresponding parts in the various figures. The embodiments herein will be better understood from the following description with reference to the drawings, in which.

DETAILED DESCRIPTION

Figure 1:
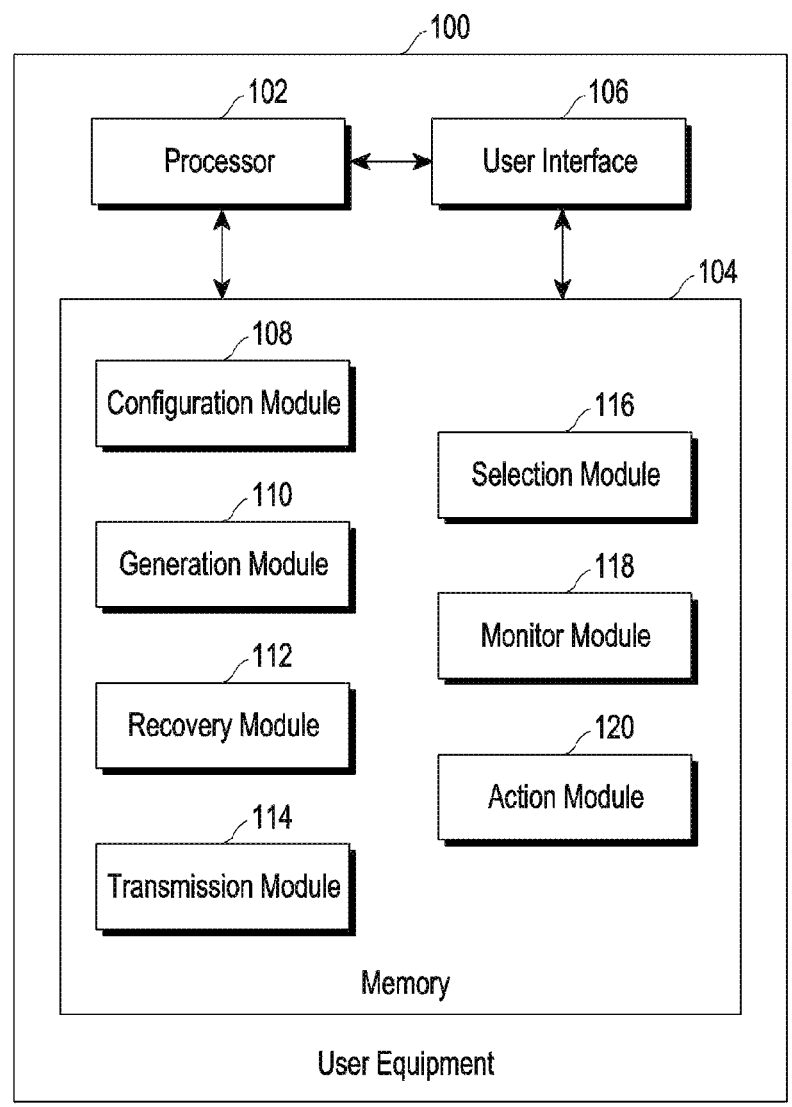
FIG. 1 illustrates a User Equipment configured for providing a beam management, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

Accordingly, the disclosure provides a User Equipment (UE) a method performed by the UE for beam management framework for carrier aggregation and beam management framework for secondary cells for supporting carrier aggregation.

In an embodiment, referring to FIG. 1, a User Equipment 100 facilitating beam management in a communication network is shown. The UE comprises a processor 102, a memory 104 coupled to the processor 104 and a user interface 106. The memory 104 stores a plurality of modules to be executed by the processor 102. The plurality of modules comprises a configuration module 108, a generation module 110, a recovery module 112, a transmission module 114, a selection module 114, a monitor module 118 and an action module 120. The transmission module 114 may be operated as a transceiver.

Figure 2:
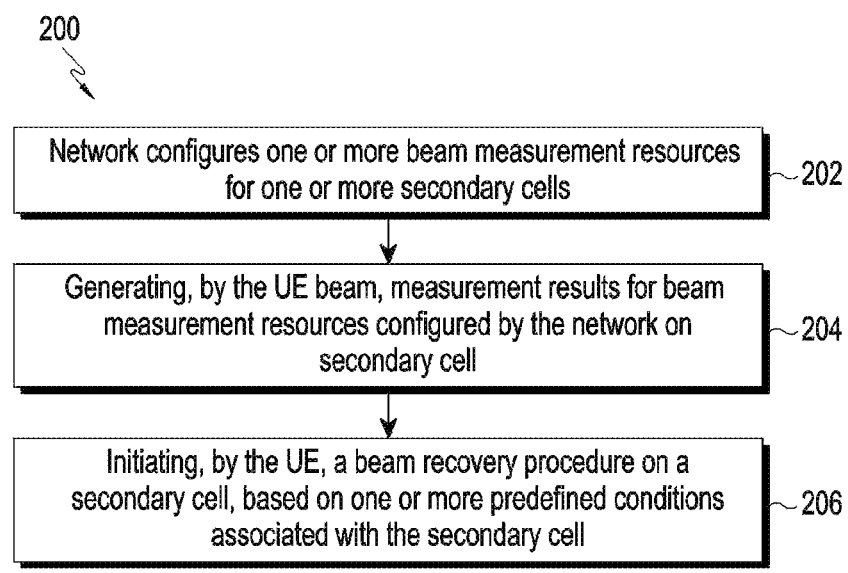
FIG. 2 illustrates a method providing a beam management in the User Equipment (UE) of FIG. 1, according to embodiments as disclosed herein.
Figure 3:
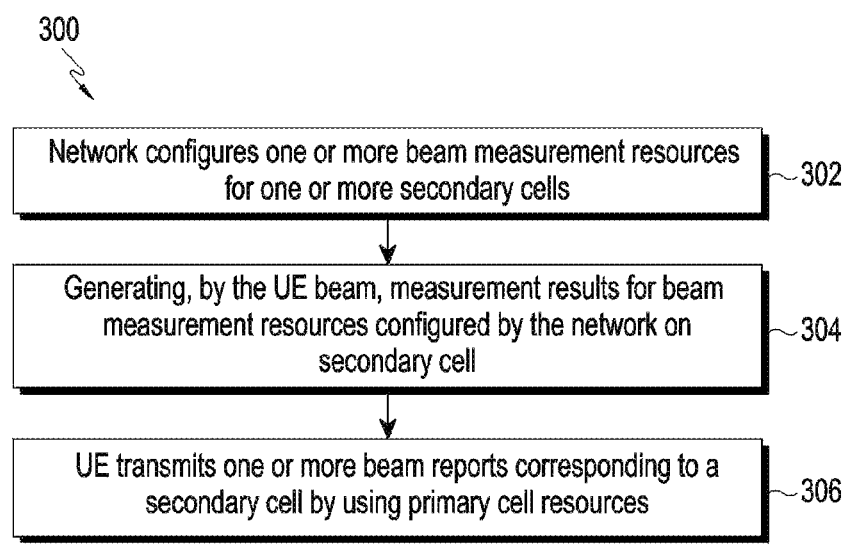
FIG. 3 illustrates a method providing a beam management in the User Equipment (UE) of FIG. 1, according to an alternate embodiment as disclosed herein.

In an embodiment, referring to FIG. 2 a method 200 providing beam management in a User Equipment is shown. The method 200 may be executed by the UE 100. At step 202, a network configures through the configuration module 108 one or more beam measurement resources for one or more secondary cells of the UE 100.

At step 204, the UE 100 generates through the generation module 110, one or more beam measurement results for the beam measurement resources so configured on a secondary cell of the one or more secondary cells. At step 206, the UE 100 initiates through a recovery module 112, a beam recovery procedure on a secondary cell based on one or more predefined conditions associated with the secondary cell.

In an alternate embodiment, a method 300 providing a beam management in the UE is shown. The method 300 may be executed by the UE 100. At step 302, one or more beam measurement resources are configured by the network through the configuration module 108 for the one or more secondary cells of the UE 100. At step 304, the UE 100 generates through the generation module 110, the one or more beam measurement results for the beam measurement resources so configured on the secondary cell.

At step 306, the UE 100 transmits through the transmission module 114, the one or more beam measurement reports corresponding to the secondary cell, by using primary cell resources. The beam measurement reports are transmitted based on one or more predefined conditions.

Figure 4:
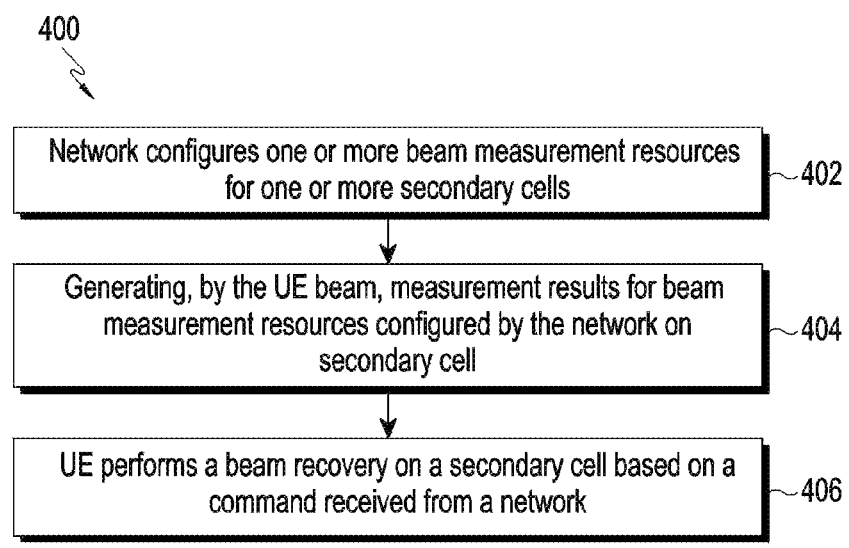
FIG. 4 illustrates a method providing a beam management in the User Equipment (UE) of FIG. 1, according to another alternate embodiment as disclosed herein.

In an alternate embodiment, referring to FIG. 4, a method 400 providing beam management in the UE is shown. The method 400 may be executed by the UE 100. At step 402, the one or more beam measurement resources are configured by the network through the configuration module 108 for the one or more secondary cells of the UE 100.

At step 404, the UE 100 generates through the generation module 110, the one or more beam measurement results for the beam measurement resources so configured on the secondary cell. At step 406, the UE 100 performs through the recovery module 112, a beam recovery on a secondary cell based on a command received from the network. The beam recovery is performed based on an indication provided by the network.

Figure 5:
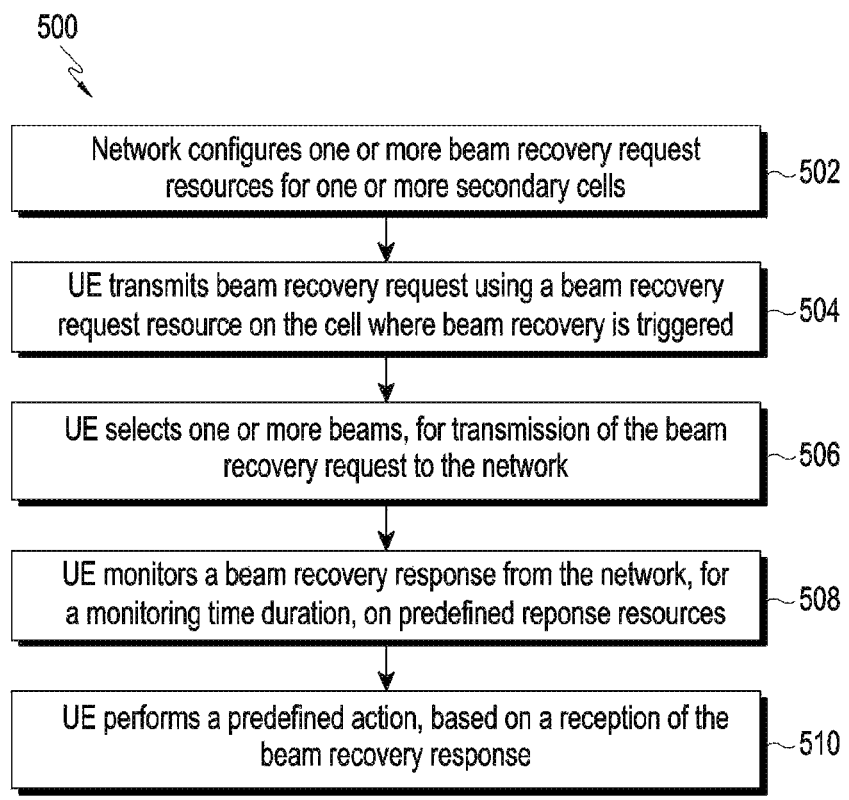
FIG. 5 illustrates a method providing a beam recovery in the User Equipment (UE) of FIG. 1, according to another alternate embodiment as disclosed herein.

In an alternate embodiment, referring to FIG. 5, a method 500 providing a beam recovery in a User Equipment (UE) is shown. The method 500 may be executed by the UE 500.

At step 502, the one or more beam measurement resources are configured by the network through the configuration module 108 for the one or more secondary cells of the UE 100.

At step 504, the UE 100 transmits a beam recovery request through the transmission module 114 by using a beam recovery request resource on the cell where beam recovery is triggered. The beam recovery request comprises an identity of a candidate beam of a secondary cell.

At step 506, the UE 100 selects through the selection module 116 one or more beams, for transmission of the beam recovery request to the network. At step 508, the UE 100 monitors through the monitoring module 118 a beam recovery response from the network, for a monitoring time duration, on a predefined response resource. The predefined response resources comprise one of a Primary cell resource (PCell resource) or a Secondary cell resource (SCell resource).

At step 510, the UE 100 performs through an action module 120, a predefined action based on a reception of the beam recovery response. The predefined action is performed according to the monitoring time duration.

The disclosure provides a mechanism for the UE 100 to perform beam management procedures through each of the method 200, the method 300, the method 400 and the method 500. The beam management procedures include at least one of a beam measurement, a beam reporting, a beam recovery and a beam failure of one of a primary cell (PCell) and a secondary cell (SCell), thereby improving reliability and mobility performance of high frequency deployment.

Figure 6:
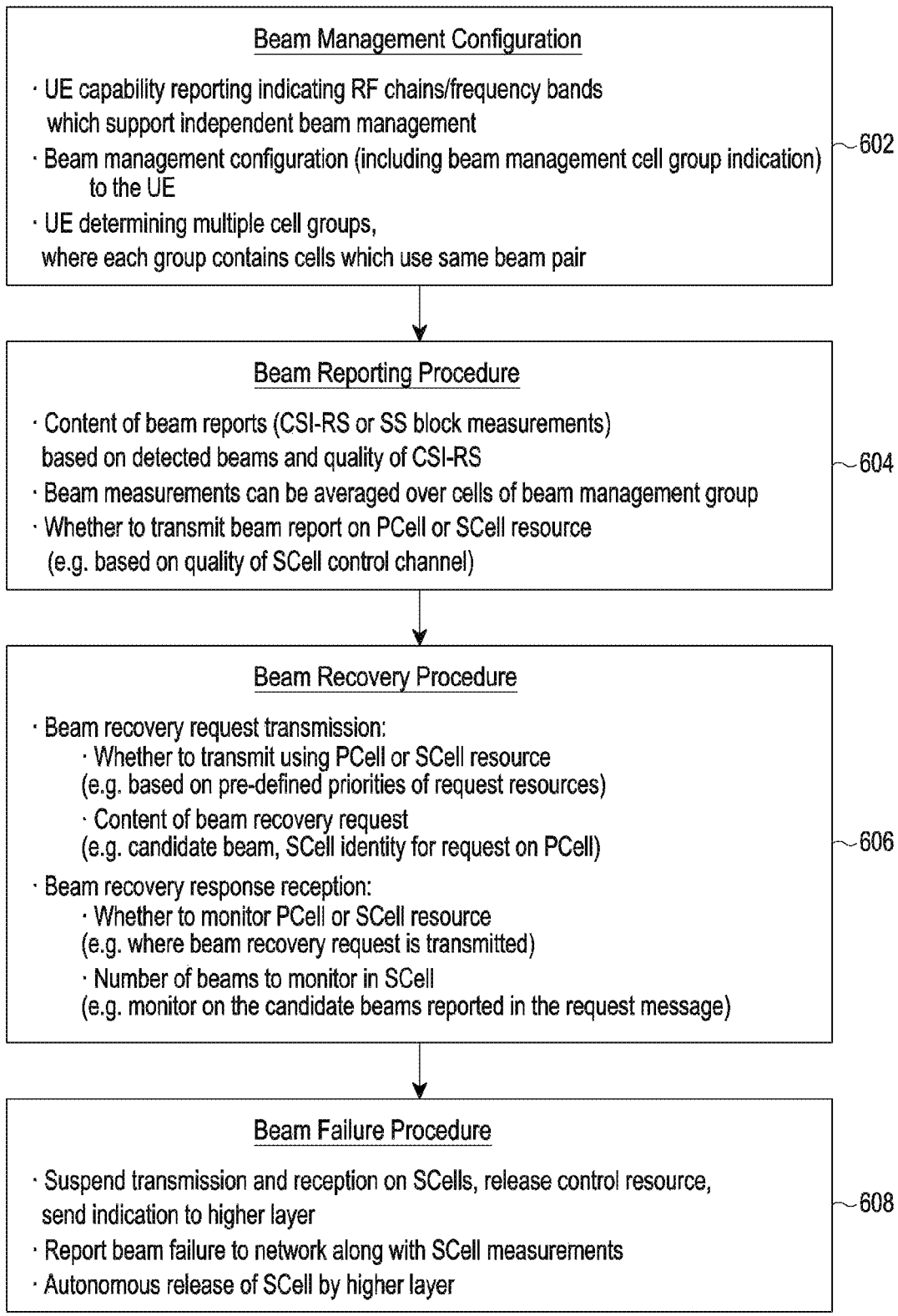
FIG. 6 illustrates details of the Beam Management, according to embodiments as disclosed herein.

Referring to FIG. 6, the embodiments herein achieve the beam management procedure for secondary cells through each of the method 200, the method 300 and the method 400 comprising of following procedure:

1) Beam Management Configuration (as Shown in Step 602 of FIG. 6):

a. The procedure starts with the UE 100 providing an assistance information to the network, indicating the capability of the UE 100 to support multiple beam management procedures. The multiple beam management procedure comprises at least one of a beam change, a beam reporting and a beam recovery concurrently on different cells. The capability of the UE 100 is based on at least one of number of Radio Frequency (RF) chains supported by the UE 100 and frequency bands supported by the UE 100, over which the UE 100 may perform independent beam management procedure.

b. Network accordingly provides beam management configuration to the UE 100 thereby configuring the UE 100 through the configuration module 108. The configuration comprises a beam management cell group configuration along with one of a channel state information-reference signal (CSI-RS) resources, SSB resources, beam reporting resources, for each of the Primary cell (PCell) and the secondary Cell (SCells).

c. Based on the provided beam management cell group configuration, the UE 100 determines multiple cell groups. Each group of the multiple cell groups comprises of cells for which the UE 100 uses a same beam pair for each of an uplink transmission and a downlink transmission. Hence, the UE 100 performs the method 200, the method 300 and the method 400 providing beam management procedure in only one cell of the cell group.

2) Beam Reporting Procedure (as Shown in Step 604 of FIG. 6):

a. For the beam reporting procedure, the UE 100 determines whether the beam results consist of one of a CSI-RS measurements or SS block. The SS block contains each of a Primary Synchronization Signal, a Secondary Synchronization Signal and a Master Information Block, measurements of the Secondary Cell (SCell). The selection of beam measurement report (or simply beam report) contents is based on at least one of number of detected CSI-RS beams and quality of the CSI-RS beams.

b. UE 100 determines whether beam measurement report is transmitted on one of the SCell resources or the Primary Cell (PCell) resources. For example, the UE 100 determines if the beam measurement report is transmitted based on a quality of SCell control channels.

3) Beam Recovery Procedure (as Shown in Step 608 of FIG. 6):

a. When the beam recovery is triggered, the UE 100 is required to perform transmission of a beam recovery request through the transmission module 114 and receive subsequent beam recovery response from network to resume transmission and reception on a cell.

b. The UE 100 determines whether the beam recovery request is transmitted on one of the PCell resource or the SCell resource. The determination is based on one of a network configuration or pre-defined priorities and associated contents of the beam recovery request for each the Pcell and the SCell are provided. The associated content comprises at least one of an identification of candidate beam(s) and an identity of the SCell is included for beam recovery transmitted on the PCell.

c. Also, the UE 100 determines whether a beam recovery response is monitored on one of the PCell downlink resources or SCell downlink resources. In an example, monitoring may be based on a location where beam recovery request is transmitted. The UE 100 also determines the beams of the SCell where the beam recovery response is monitored based on at least one of a quality of SCell beams and candidate beams reported in the beam recover request's message.

4) Beam Failure Procedure (as Shown in Step 608 of FIG. 6):

a. If the beam recovery (procedure) is not successful, then the UE 100 suspends each of a transmission on the SCell resources and reception on the SCell resources, and releases PUCCH resources associated with the SCell and reports beam failure to higher layer.

b. Higher layer may subsequently transmit a report to the network indicating measurements of at least one of the SCell and/or performs an autonomous release of SCell.

The UE 100 may be one of a chosen or configured by a cellular network (or network) not to perform subset of the each of the above procedures (Beam management configuration, the beam reporting procedure, the beam recovery procedure and the beam failure procedure). This is to be understood that, the procedures mentioned in the disclosure are applicable for any technology and not restricted to 3GPP 5G technology.

Figure 7:
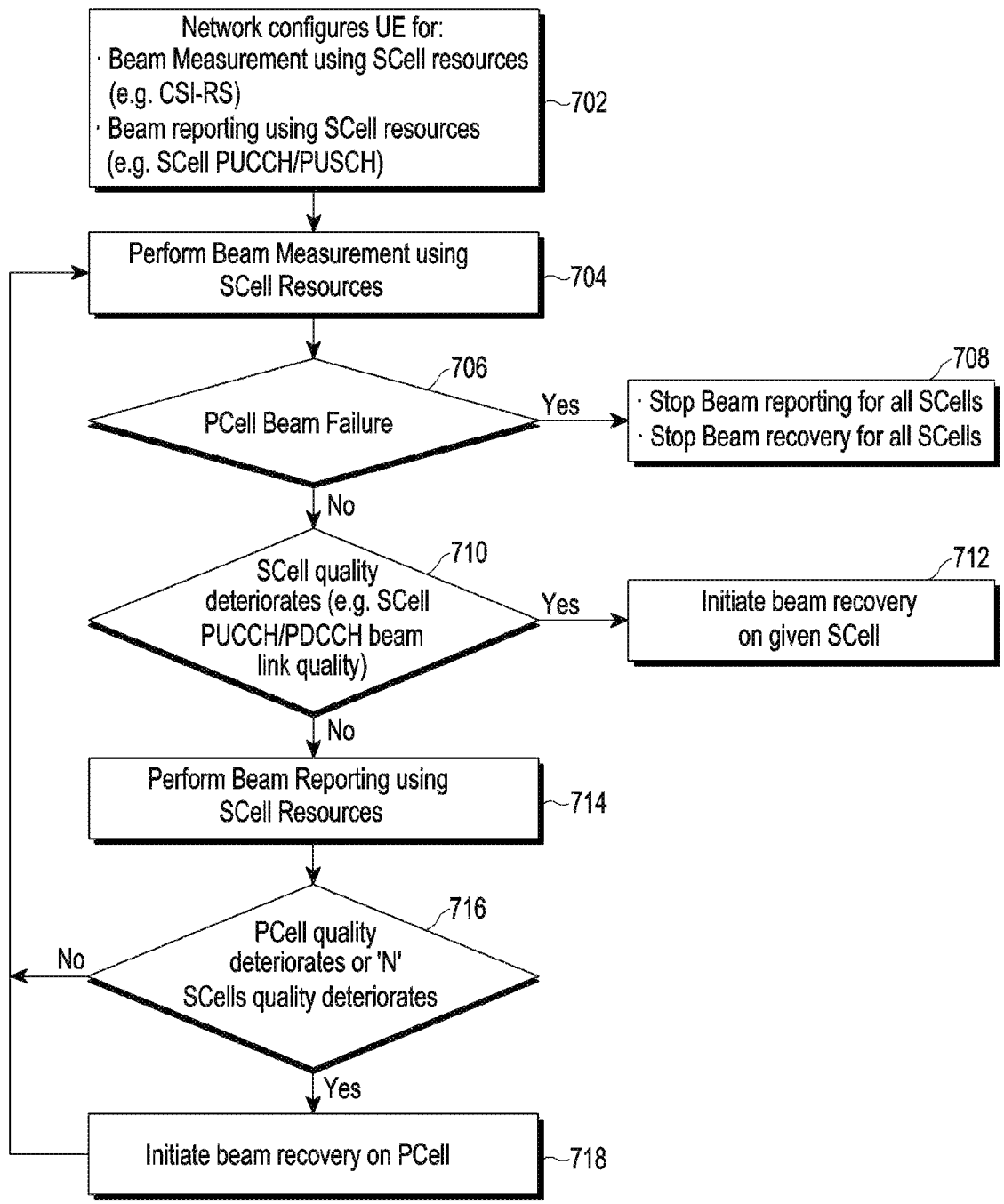
FIG. 7 illustrates details for the Beam Management, according to an alternate embodiment as disclosed herein.

Beam Management Procedure: Details of the Method 200, the Method 300, and the Method 400:

In one embodiment of the disclosure, the beam management procedure is performed as depicted in FIG. 7:

1) The UE 100 performs beam measurements on the SCell by using the SCell resources. The SCell resources comprises at least one of a CSI-RS and SS block transmissions of SCell. As shown in step 702, the Cellular network may configure through the configuration module 108, the one or more beam measurement resources for one or more secondary cells for one of the beam recovery or a link recovery, such that each beam measurement resource for the secondary cell comprises of a set of reference signal resources comprising of Synchronization Signal (SS) block indices and CSI-RS resource identifiers (as shown in step 704). Also, each beam measurement resource is associated with an identity of the secondary cell. The identity of the secondary cell comprises at least one of a secondary cell index, an Absolute Radio Frequency Channel Number (ARFCN), a physical cell identity, a secondary cell identity. The secondary cell identity is one of an explicitly provided along with each beam measurement resource or implicitly associated with the beam measurement resource by including beam measurement resource configuration within a secondary cell configuration container. The UE 100 is then configured through the configuration module 108 to perform reporting of beam measurements using the SCell resources. The SCell resources comprises one of the PUCCH or Physical Uplink Shared Channel (PUSCH) of the SCell.

2) If the beam measurement results indicate that communication cannot be sustained on the given SCell then the UE 100 initiates the beam recovery procedure on the given SCell through the recovery module 112. The beam recovery on SCell is initiated if one or more of predefined conditions is satisfied for the SCell, the predefined condition comprises:

a. A state when quality of all beams (i.e. SSB and/or CSI-RS resources configured to UE 100 of the SCell) are below a certain threshold. The threshold value comprises one of a threshold value configured by the network or a predefined threshold value. The threshold value configured by the network comprises one a dedicated RRC configuration or a system information.

b. A state when quality of beam pair link associated with a downlink control channel of the SCell (may also be referred radio resources of the SCell) (if configured) is below a certain level. The quality is determined to be below the certain level if one or more of following is satisfied:

i. Quality is less than a threshold. The threshold comprises one of the threshold configured by the network or the predefined threshold value. The threshold configured by the network is configured by using one of the dedicated RRC configuration or the system information.

ii. Time-out of an associated timer is initiated when the UE 100 is not able to decode downlink control channel or when quality is less than a threshold. Each of a timer duration and the threshold value are configured by one of the network or the predefined value. Each of the timer duration and the threshold value configured by the network, is configured by using one of the dedicated RRC configuration or the system information.

c. If number of decoding attempts of the downlink control channel is greater than the threshold configured by one of the network or the predefined threshold value. The threshold value configured by the network is configured by using one of the dedicated RRC configuration or the system information.

d. The predefine condition comprises a state when quality of beam pair link associated with the uplink control channel of the SCell (if configured) is below a certain level. The quality is determined to be below the certain level if one or more of following is satisfied:

i. A state when the quality is less the threshold value configured by one of the network or the predefined threshold value. The threshold value configured by the network is configured by using one of the dedicated RRC configuration or the system information.

ii. Time-out of an associated timer which is initiated when quality is less than the threshold. The timer duration and the threshold value are configured by one of the network or the predefined value. Each of the timer duration and the threshold value configured by the network is configured by using one of the dedicated RRC configuration or the system information.

3) As shown in step 706, 708, 710, 712, 714 and step 716, if quality of the beam pair link corresponding to the uplink control channel in the PCell or downlink control channel in PCell (may also be referred as radio resources of the PCell) falls below the certain level (using similar criteria as defined above) or if quality of beam pair links corresponding to one of the uplink control channel or the downlink control channel falls below the certain level (using similar criteria as defined above) for at least 'N' configured SCells, then a. Value of 'N' is configured by the network by using one of the RRC or a MAC CE or a Layer-1 signaling. Value of 'N' may be a pre-defined value, for example, N is equal to number of configured SCells, b. As shown in step 718, the UE 100 initiates through the recovery module 112, the beam recovery on the PCell which includes candidate beam(s) selection of the PCell and transmission of beam recovery request using the candidate beam(s) through the transmission module 114.

c. UE 100 continues to perform beam reporting of configured SCells through the action module 120.

4) If beam failure occurs on the PCell, the UE 100 suspends beam reporting and beam recovery procedure for all configured SCells through the action module 120.

Figure 8:
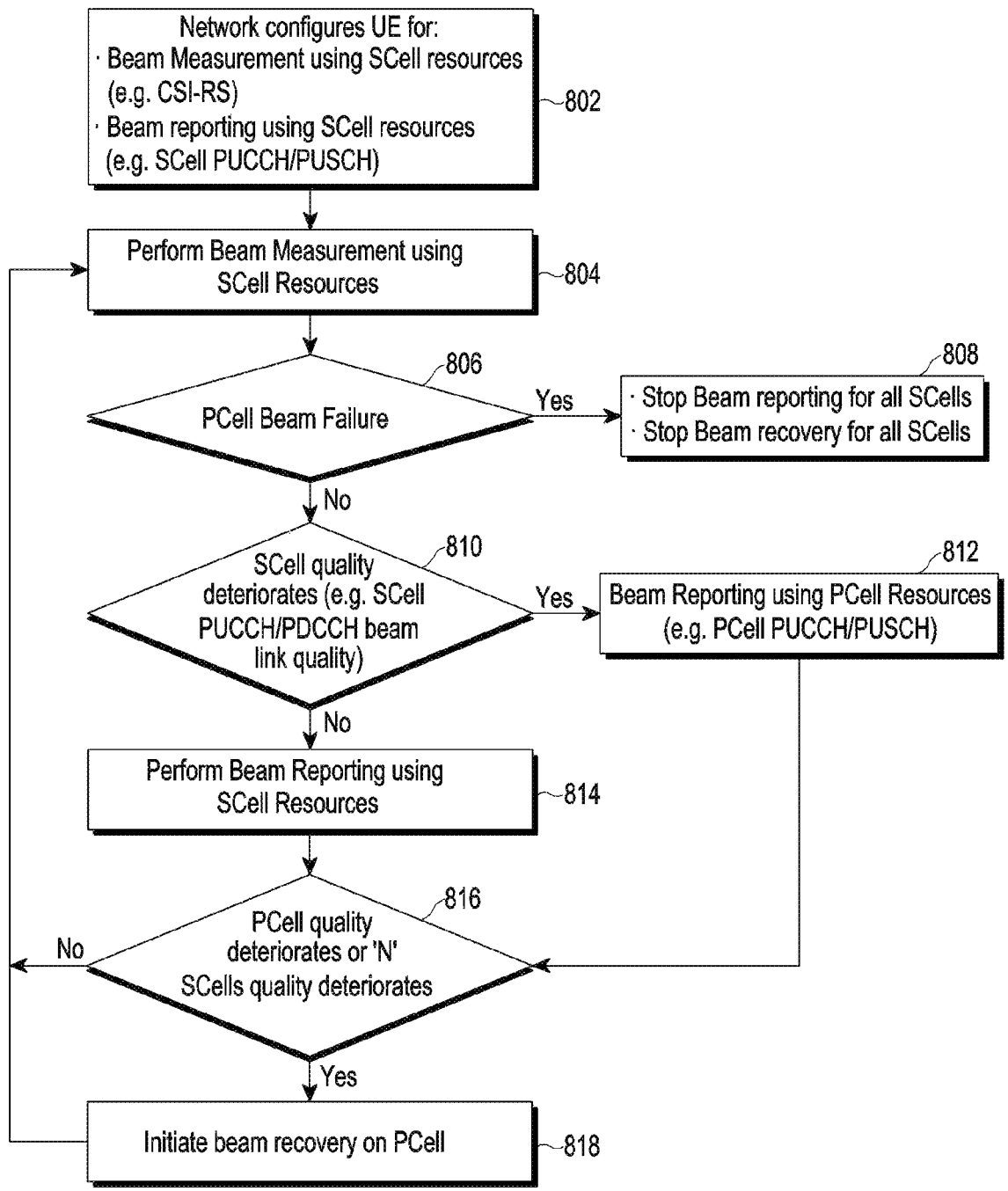
FIG. 8 illustrates details of Beam Management, according to an alternate embodiment as disclosed herein.

In an Alternate Embodiment, the Beam Management Procedure is Described Below (Details of the Method 300):

In an embodiment of the disclosure, the beam management procedure is performed as depicted in FIG. 8:

1) As shown in step 802, the UE 100 performs beam measurements on the SCell using the SCell resources. The SCell resources comprises one of the CSI-RS or SS block transmissions of the SCell. Cellular network may configure through the configuration module 108, the one or more beam measurement resources for the one or more secondary cells for one of the beam recovery or the link recovery, such that each beam measurement resource for the secondary cell comprises of a set of reference signal resources comprising of the Synchronization Signal (SS) block indices and CSI-RS resource identifiers (as shown in step 804). Also, each beam measurement resource is associated with the identity of the secondary cell. The identity of the secondary cell comprises at least one of the secondary cell index, the Absolute Radio Frequency Channel Number (ARFCN), the physical cell identity, the secondary cell identity. The secondary cell identity is one of the explicitly provided along with each beam measurement resource or is implicitly associated with the beam measurement resource by including beam measurement resource configuration within a secondary cell configuration container. The UE 100 is configured to perform reporting of the beam measurements using SCell resources comprising one of a PUCCH or PUSCH of SCell.

2) If the beam measurement results indicate that communication may not be sustained on the given SCell then the UE 100 performs transmission through the transmission module 114, of all further beam reports corresponding to the given SCell using the PCell resources comprising PUCCH/PUSCH of PCell. The transmission is triggered if one or more of predefined conditions is satisfied for the SCell, the predefined condition comprises:

a. A state when quality of all beams (i.e. CSI-RS and/or SSB resources configured of SCell) are below the certain threshold. The threshold value is one of the threshold value configured by the network or is the predefined threshold value. The threshold configured by the network is configured by using one of the dedicated RRC configuration or the system information.

b. A state when quality of beam pair link associated with downlink control channel of the SCell (if configured) is below the certain level. The quality is determined to be below the certain level if one or more of following is satisfied:

i. Quality is less than the threshold value. The threshold value is one of the threshold value configured by the network or is the predefined threshold value. The threshold configured by the network is configured by using one of the dedicated RRC configuration or the system information.

ii. Time-out of the associated timer which is initiated when the UE 100 is not able to decode downlink control channel or when quality is less than the threshold value. The timer duration and threshold value is one of the configured by the network or is the predefined threshold value and predefined time-out. Each of the time duration and the threshold configured by the network is configured by using one of the dedicated RRC configuration or the system information.

iii. If number of decoding attempts of the downlink control channel is greater than the threshold which is configured by the network (e.g. using the dedicated RRC configuration or the system information) or is the predefined threshold value.

c. Quality of the beam pair link associated with the uplink control channel of the SCell (if configured) is below the certain level. The quality is determined to be below the certain level if one or more of following is satisfied:

i. Quality is less than the threshold which is configured by the network (e.g. by using one of the dedicated RRC configuration or the system information) or is the predefined threshold value ii. Time-out of the associated timer which is initiated when quality is less than the threshold value. Each of the timer duration and the threshold value are configured by the network (example, using the dedicated RRC configuration or the system information) or the predefined value 3) As shown in step 806, 808, 810, 812, 814 and 816, if quality of the beam pair link corresponding to one of the uplink control channel in the PCell or downlink control channel in the PCell falls below the certain level (using similar criteria as defined above) or if the quality of the beam pair links corresponding to one of the uplink control channel or the downlink control channel falls below the certain level (using similar criteria as defined above) for at least 'N' configured SCells, then a. Value of 'N' is configured by the network by using one of the RRC, the MAC CE, the Layer-1 signaling or the pre-defined value. For example, N is equal to number of configured SCells.

b. The UE 100 initiates the beam recovery through the recovery module 112, on the PCell which includes candidate beam(s) selection of the PCell and transmission of the beam recovery request using the candidate beam(s) through the transmission module 114.

c. UE 100 continues to perform beam reporting of configured SCells

4) If beam failure occurs on the PCell, the UE 100, through the action module 120, suspends each of the beam reporting and the beam recovery procedure for all configured SCells (as shown in step 818)

Figure 9:
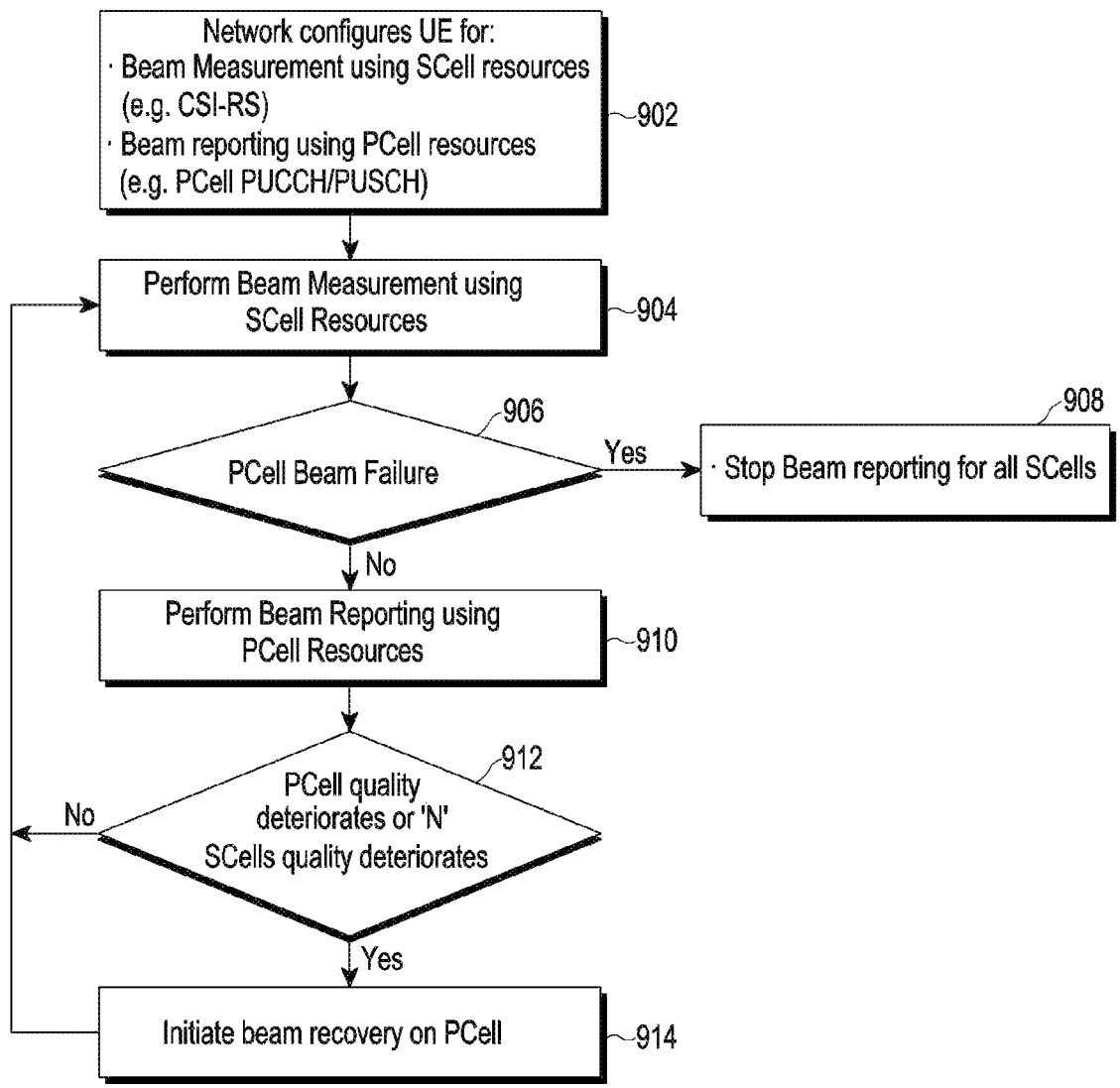
FIG. 9 illustrates details of the Beam Management, according to alternate embodiments as disclosed herein.

In an Alternate Embodiment, the Beam Management Procedure is Described Below (Method 400):

In an embodiment of the disclosure, beam management procedure is performed as depicted in FIG. 9:

1) As shown in step 902, the UE 100 performs beam measurements on an SCell using SCell resources (e.g. CSI-RS or SS block transmissions of SCell) and is configured through the configuration module 108, to perform reporting of the beam measurements using PCell resources (e.g. PUCCH or PUSCH of PCell), as shown in step 904.

2) UE 100 does not take any autonomous action based on measurements of one of a given SCell beams or quality of beam pair link corresponding to one of the downlink control channel of the SCell or the uplink control channel of the SCell. If the beam reports indicate that communication may not be sustained on the SCell, then the network perform one of a release or modify the SCell by using the RRC reconfiguration message. The network may one of the update the beams for control channels or provide updated configuration for beam management. The UE 100 does not initiate beam recovery on the given SCell.

3) As shown in steps 906, 908, 910 and 912, if quality of beam pair link corresponding to one of the uplink control channel in the PCell or downlink control channel in the PCell falls below the certain level (using similar criteria as defined above) or if quality of the beam pair links corresponding to one of the uplink control channel or the downlink control channel falls below the certain level (using similar criteria as defined above) for at least 'N' SCells, then 1)

a. Value of 'N' is configured by network by using one of the RRC, the MAC CE, the Layer-1 signaling. The 'N' may be the pre-defined value. For example, the 'N' is equal to number of configured SCells b. UE 100 initiates through the recovery module 112, the beam recovery on the PCell which includes the candidate beam(s) selection of the PCell and transmission of beam recovery request using the candidate beam(s)

c. UE 100 continues to perform the beam reporting of configured SCells

4) If the beam failure occurs on the PCell, the UE 100 suspends through the action module 120, each of the beam reporting and the beam recovery procedure for all configured SCells, as shown step 914.

Figure 10:
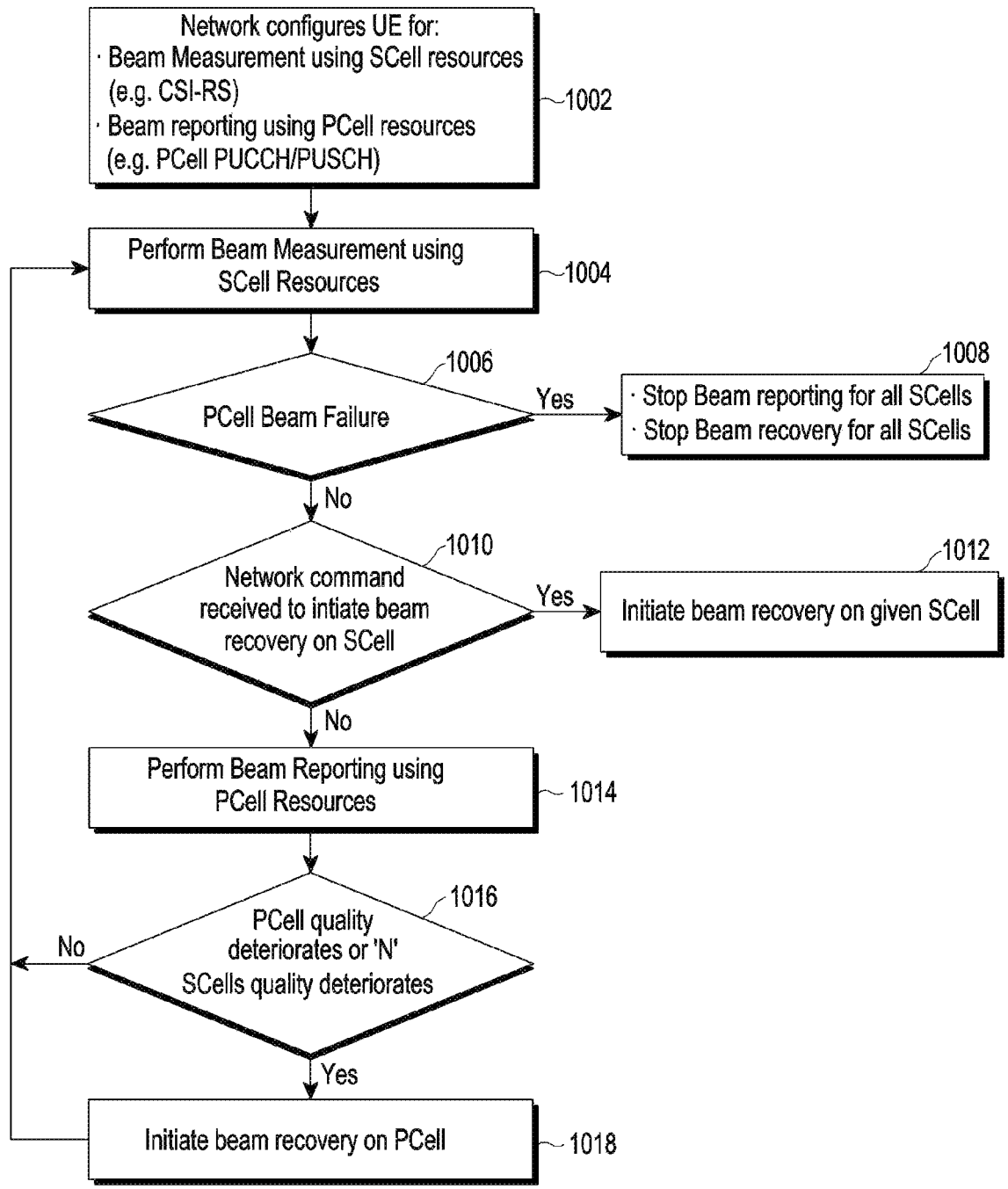
FIG. 10 illustrates details of the Beam Management, according to alternate embodiments as disclosed herein.

In an Alternate Embodiment the Beam Management Procedure is Described Below:

In an embodiment of the disclosure, beam management procedure is performed as depicted in FIG. 10:

1) As shown in step 1002, the UE 100 performs beam measurements on the SCell by using the SCell resources (example, CSI-RS or SS block transmissions of SCell) and is configured by the configuration module 108, to perform reporting of the beam measurements by using the PCell resources (example, PUCCH or PUSCH of PCell), as shown in step 1104. Cellular network (or simply the network) may configure through the configuration module 108, the one or more beam measurement resources for the one or more secondary cells for one of the beam recovery or the link recovery, such that each beam measurement resource for the secondary cell comprises of the set of reference signal resources comprising of the Synchronization Signal (SS) block indices and the CSI-RS resource identifiers. Also, each beam measurement resource is associated with the identity of the secondary cell. The identity of the secondary cell comprises at least one of the secondary cell index, the Absolute Radio Frequency Channel Number (ARFCN), the physical cell identity, the secondary cell identity. Secondary cell identity is one of the explicitly provided along with each beam measurement resource or is implicitly associated with the beam measurement resource by including beam measurement resource configuration within the secondary cell configuration container.

2) UE 100 does not take any autonomous action based on measurements of one of the SCell beams or the quality of beam pair link corresponding to one of the downlink control channel or the uplink control channel of the SCell.

3) If the beam reports indicate that communication may not be sustained on the SCell, then the network indicates to the UE 100 to perform the beam recovery, through the recovery module 112, on the SCell based on a Layer-1 command. The Layer-1 command, if provided using the PCell downlink control channel, contains the identity of the SCell (e.g. SCell index, ARFCN, physical cell identity or SCell identity or CSI-RS resource identifier) where beam recovery is triggered. If the Layer-1 command is provided by using the SCell downlink control channel, then the UE 100 initiates the beam recovery through the recovery module 112, on the SCell where the Layer-1 command is received. The Layer-1 message may additionally contain beam(s) of SCell where UE 100 is required to transmit beam recovery request message through the transmission module 114. The Layer-1 message may additionally contain at least one of the updated CSI-RS reporting and the measurement configuration.

4) After receiving the Layer-1 beam recovery command, the UE 100 performs beam recovery procedure through the recovery module 112 on the SCell.

5) As shown in steps 1006, 1008, 1010, 1012, 1014 and 1016, if quality of beam pair link corresponding to one of the uplink control channel in the PCell or downlink control channel in the PCell falls below the certain level (using similar criteria as defined above)) or if the quality of beam pair links corresponding to one of the uplink control channel or the downlink control channel falls below the certain level (using similar criteria as defined above) for at least 'N' SCells, then a. Value of 'N' is configured by network by using one of the RRC, the MAC CE, the Layer-1 signaling. The 'N' may be the pre-defined value. For example, 'N' is equal to the number of configured SCells.

b. UE 100 initiates beam recovery through the recovery module 112 on the PCell which includes the candidate beam(s) selection of the PCell and transmission of beam recovery request using the candidate beam(s)

c. UE 100 continues to perform beam reporting of configured SCells

6) If the beam failure occurs on the PCell, the UE 100 suspends through the action module 120, each of the beam reporting and the beam recovery procedure for all configured SCells (as shown in step 1018).

Figure 11:
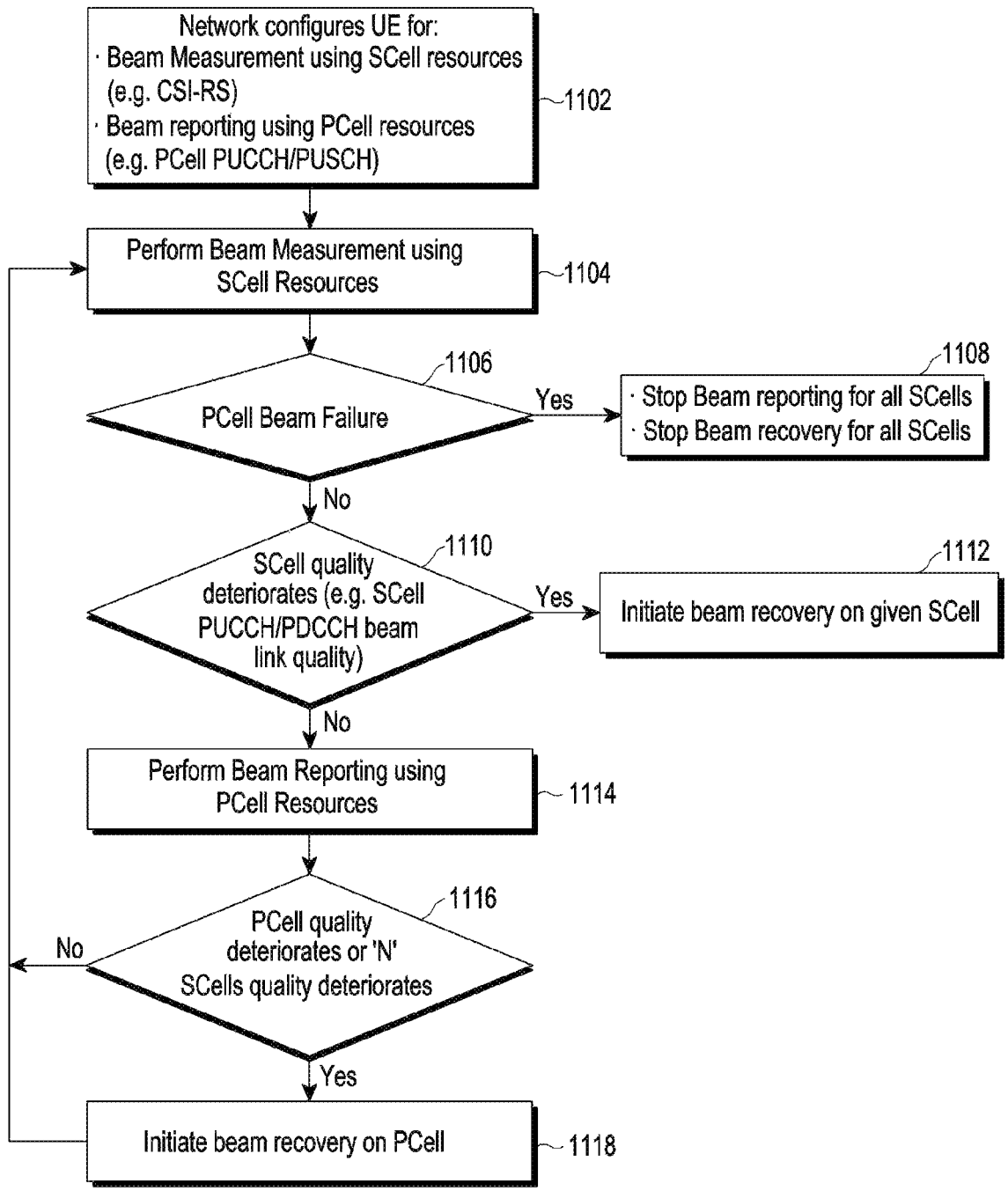
FIG. 11 illustrates details of the Beam Management, according to alternate embodiments as disclosed herein.

In an Alternate Embodiment, the Beam Management Procedure is Described Below:

In an embodiment of the disclosure, beam management procedure is performed as depicted in FIG. 11:

1) As shown in step 1102, the UE 100 performs beam measurements on the SCell using the SCell resources (e.g. CSI-RS or SS block transmissions of SCell) and performs reporting of beam measurements using the PCell resources (e.g. PUCCH or PUSCH of PCell), as shown in step 1104. Cellular network may configure through the configuration module 108, the one or more beam measurement resources for the one or more secondary cells for one of the beam recovery or the link recovery, such that each beam measurement resource for the secondary cell comprises of the set of reference signal resources comprising of the Synchronization Signal (SS) block indices and the CSI-RS resource identifiers. Also, each beam measurement resource is associated with the identity of the secondary cell. The identity of the secondary cell comprises at least one of the secondary cell index, the Absolute Radio Frequency Channel Number (ARFCN), the physical cell identity, the secondary cell identity. The secondary cell identity is one of the explicitly provided along with each beam measurement resource or is implicitly associated with the beam measurement resource by including beam measurement resource configuration within the secondary cell configuration container.

2) If the beam measurement results indicate that communication cannot be sustained on the SCell then the UE 100 initiates beam recovery procedure through the recovery module 112 on the SCell. Beam recovery on the SCell is initiated if one or more of predefined conditions is satisfied for the SCell, the predefined condition comprises:

a. the state when the quality of all beams (i.e. SSB and/or CSI-RS resources configured of SCell) are below the certain threshold. The threshold value is one of the threshold value configured by the network (e.g. using dedicated RRC configuration or system information) or is the predefined threshold value b. the state when the quality of beam pair link associated with the downlink control channel of SCell (if configured) is below the certain level. The quality is determined to be below the certain level if one or more of following is satisfied:

i. Quality is less than the threshold which is configured by one of network (e.g. using the dedicated RRC configuration or the system information) or is the predefined threshold value ii. Time-out of the associated timer which is initiated when the UE 100 is not able to decode downlink control channel or when quality is less than the threshold. Each of the timer duration and the threshold value are configured by the network (e.g. using dedicated RRC configuration or system information) or is the predefined value iii. If number of decoding attempts of downlink control channel is greater than the threshold which is configured by one of the network (e.g. using dedicated RRC configuration or system information) or is the predefined threshold value.

c. Quality of the beam pair link associated with the uplink control channel of SCell (if configured) is below the certain level. The quality is determined to be below the certain level if one or more of following is satisfied:

i. Quality is less than the threshold which is configured by one of the network (e.g. using dedicated RRC configuration or system information) or is the predefined threshold value ii. Time-out of the associated timer which is initiated when quality is less than the threshold. The timer duration and threshold value are one of the configured by the network (e.g. using dedicated RRC configuration or system information) or are the predefined value 3) As shown in steps 1106, 1108, 1110, 1112, 1114 and 1116, if quality of the beam pair link corresponding to one of the uplink control channel in the PCell or the downlink control channel in the PCell falls below the certain level (using similar criteria as defined above)) or if the quality of beam pair links corresponding to one of the uplink control channel or the downlink control channel falls below the certain level (using similar criteria as defined above) for at least 'N' SCells, then a. Value of 'N' is configured by one of the network by using one of the RRC, the MAC CE, the Layer-1 signaling or the pre-defined value. For example, 'N' is equal to the number of configured SCells)

b. UE 100 initiates the beam recovery through the recovery module 112, on the PCell which includes the candidate beam(s) selection of the PCell and transmission of beam recovery request using the candidate beam(s)

c. UE 100 continues to perform beam reporting of configured SCells

4) If the beam failure occurs on PCell, the UE 100 suspends through the action module 120, each of the beam reporting and the beam recovery procedure for all configured SCells (as shown in steps 1118).

Figure 12:
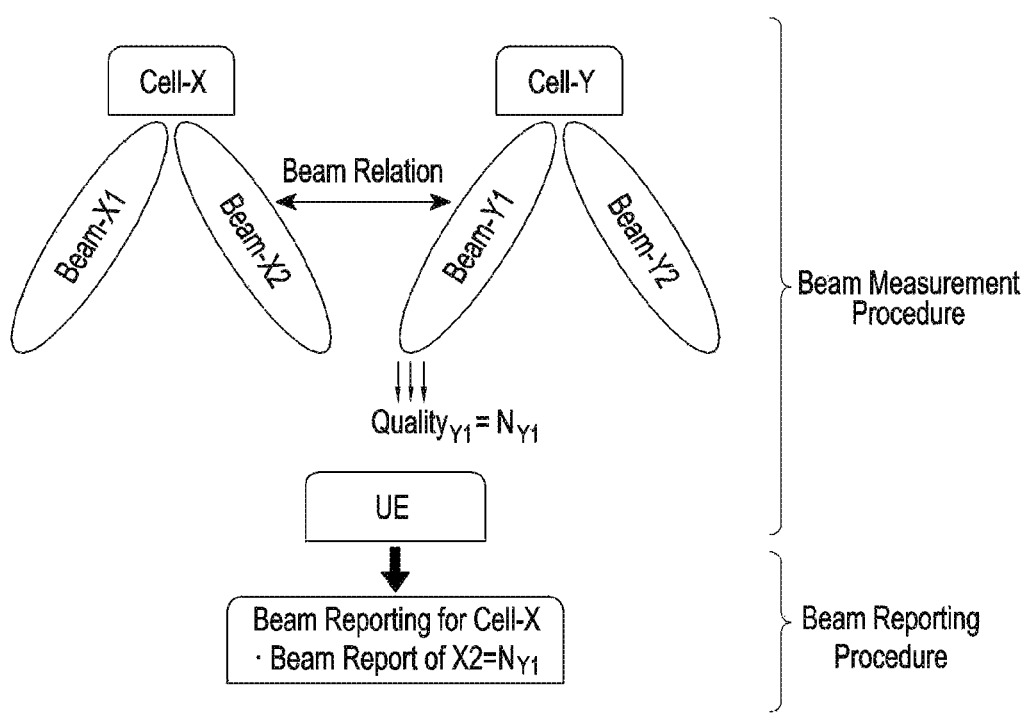
FIG. 12 illustrates beam measurement corresponding to one cell derived using beam of another cell, according to embodiments as disclosed herein.

FIG. 12 illustrates beam measurement corresponding to one cell derived using beam of another cell, according to an alternate embodiment disclosed herein. Beam measurement procedure is performed by the UE 100 for each of the cell-X (Beam-X1 and Beam-X2)) and the cell-Y (Beam-Y1 and beam Y-2). Based on the quality (quality$_{Y1}$=N$_{Y1}$) the UE 100 performs the beam reporting for the cell-X, with beam report of X2=N$_{Y1}$.

Figure 13:
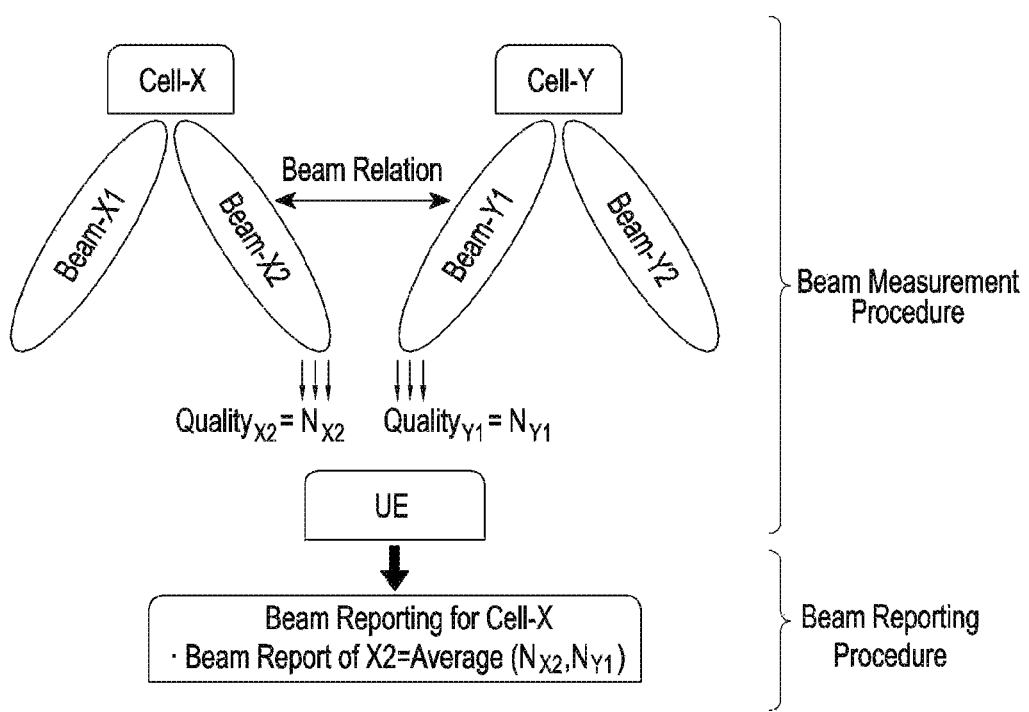
FIG. 13 illustrates beam measurements corresponding to one cell derived using averaged beam results from multiple cells, according to an alternate embodiment as disclosed herein.

FIG. 13 illustrates beam measurements corresponding to one cell derived using averaged beam results from multiple cells, according to an alternate embodiment as disclosed herein. Beam measurement procedure is performed by the UE 100 for each of the cell-X (Beam-X1 and Beam-X2)) and the cell-Y (Beam-Y1 and beam Y-2). Based on the quality (quality$_{X2}$=N$_{X2\ and}$ quality$_{Y1}$=N$_{Y1}$) the UE 100 performs the beam reporting for the cell-X, with beam report of X2=average (N$_{X2}$, N$_{Y1}$).

Figure 14:
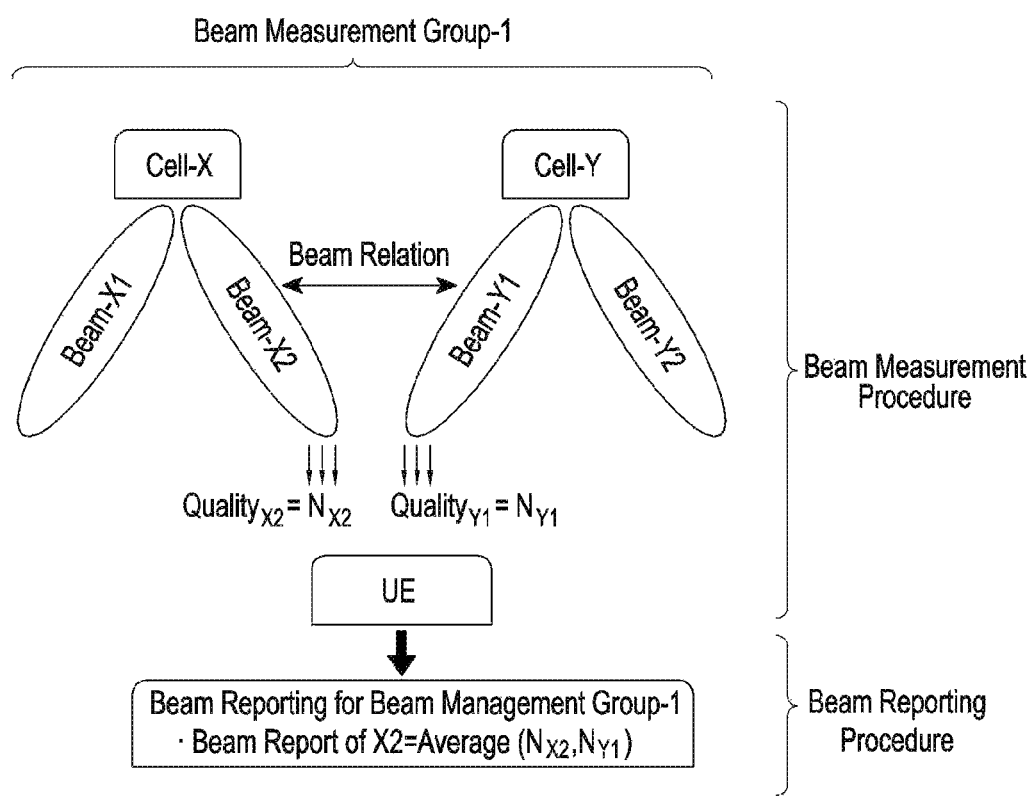
FIG. 14 illustrates the UE performing beam measurement and beam reporting per beam management cell group, according to embodiments as disclosed herein.

FIG. 14 illustrates UE performing beam measurement and beam reporting per beam management cell group, according to embodiments as disclosed herein. For the beam management group-1, the Beam measurement procedure is performed by the UE 100 for each of the cell-X (Beam-X1 and Beam-X2)) and the cell-Y (Beam-Y1 and beam Y-2). Based on the quality (quality$_{X2}$=N$_{X2\ and}$ quality$_{Y1}$=N$_{Y1}$) the UE 100 performs the beam reporting for the beam management group-1 for the cell-X2, with beam report of X2=average (N$_{X2}$, N$_{Y1}$).

Figure 15:
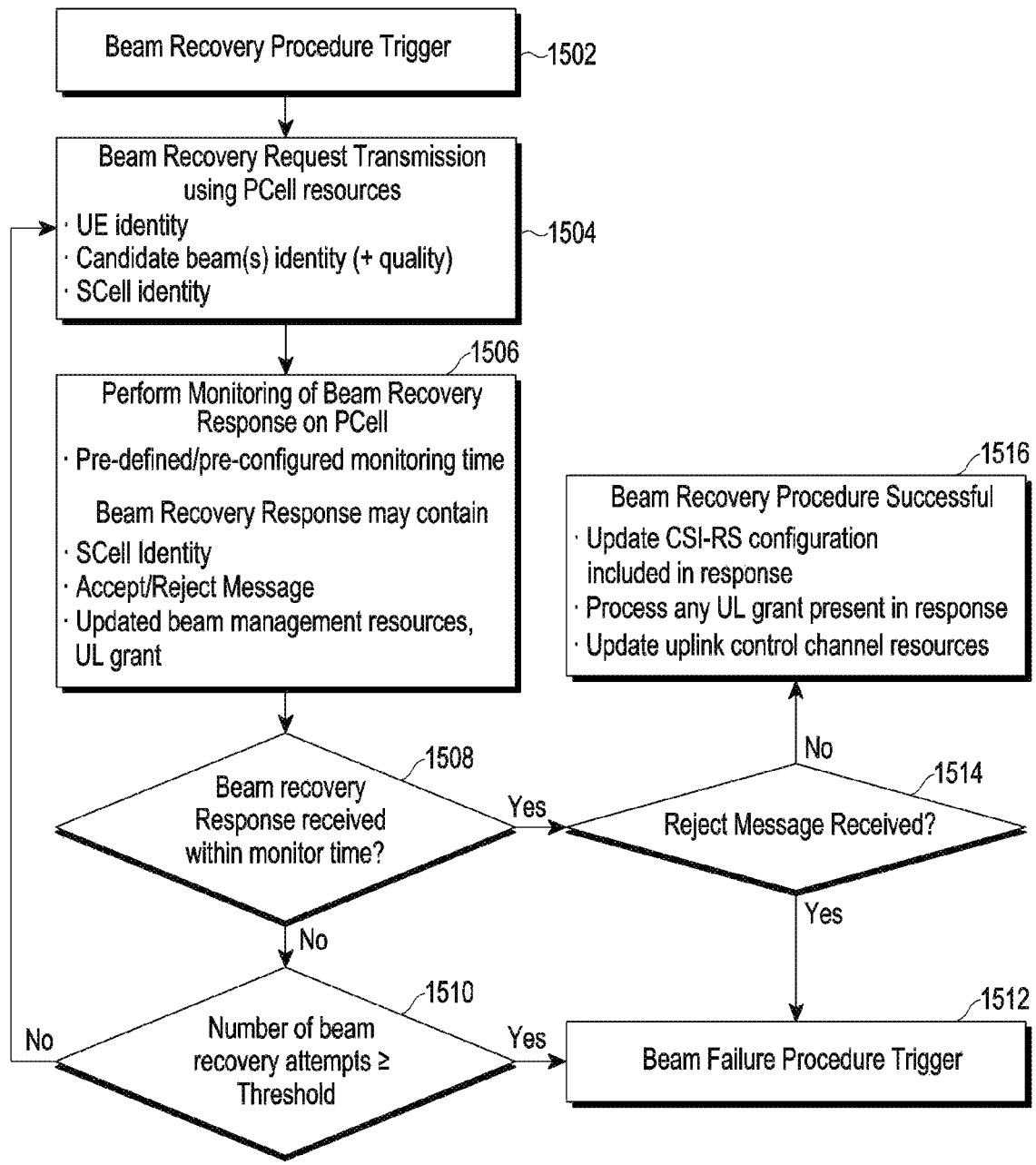
FIG. 15 illustrates a Beam Recovery Procedure, according to embodiments as disclosed herein.

FIG. 15 illustrates Beam Recovery Procedure, according to embodiments as disclosed herein.

Figure 16:
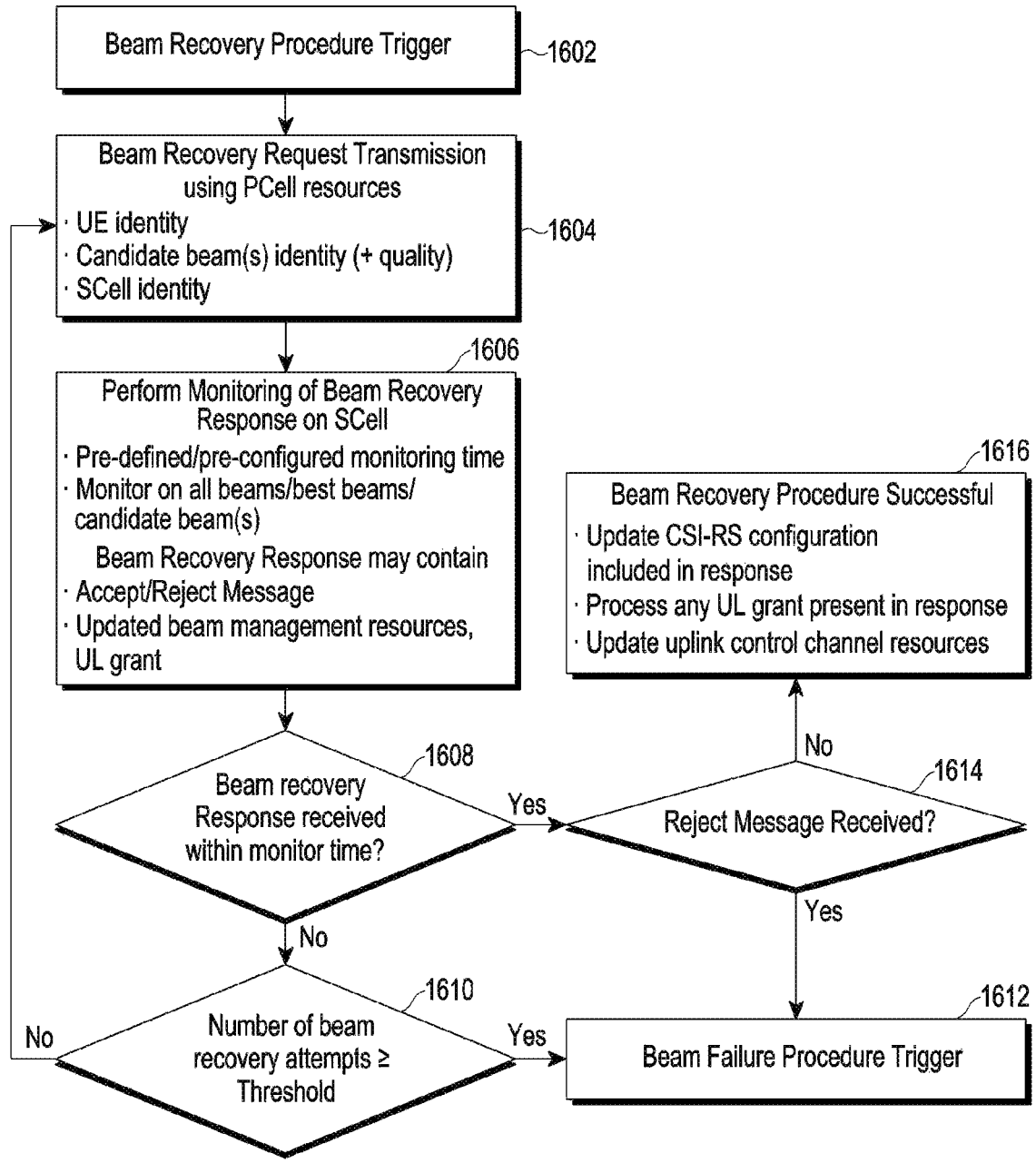
FIG. 16 illustrates the Beam Recovery Procedure, according to an alternate embodiment as disclosed herein.

FIG. 16 illustrates the Beam Recovery Procedure, according to an alternate embodiment as disclosed herein.

Figure 17:
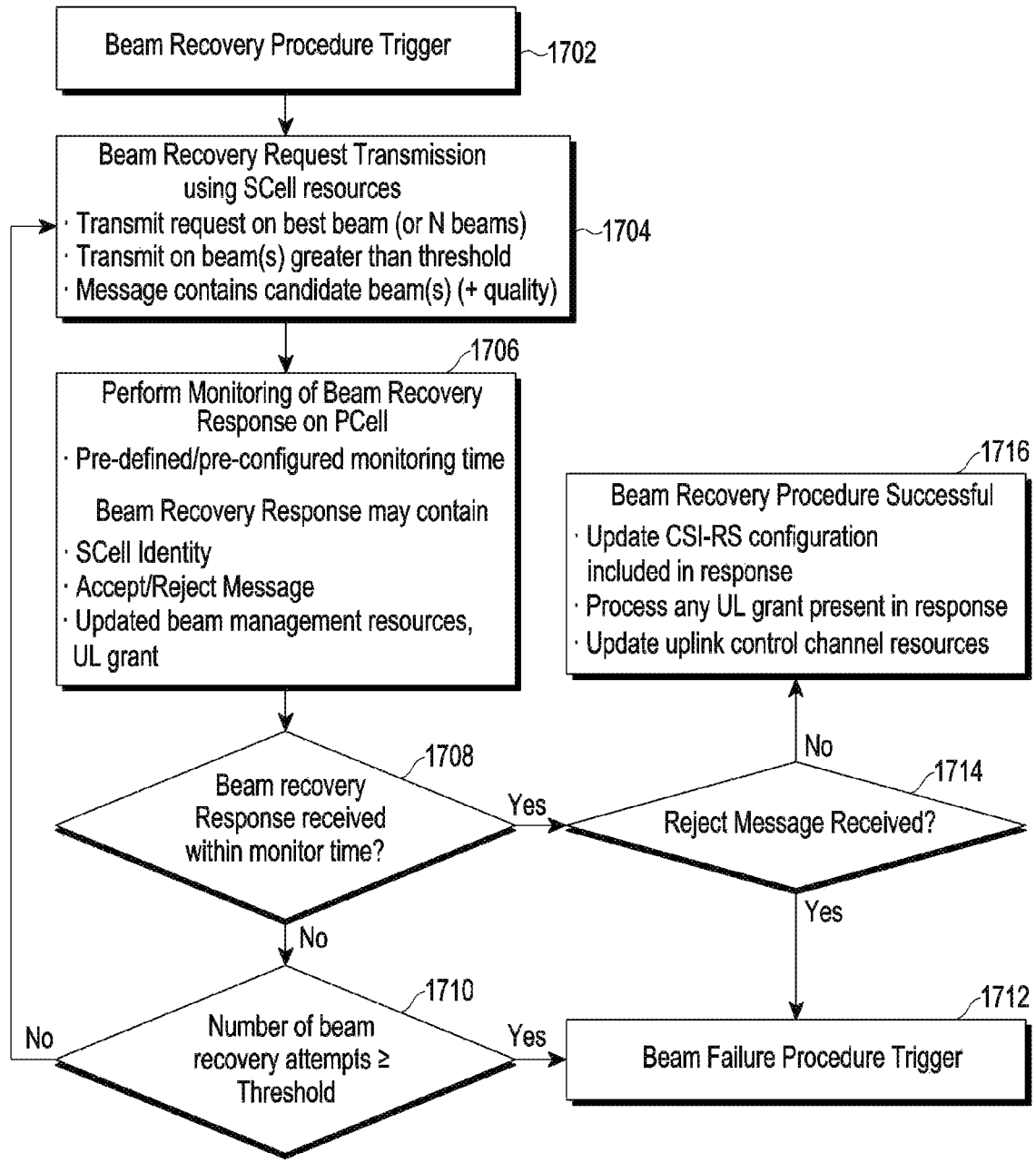
FIG. 17 illustrates the Beam Recovery Procedure, according to an alternate embodiment as disclosed herein.

FIG. 17 illustrates the Beam Recovery Procedure, according to an alternate embodiment as disclosed herein.

Figure 18:
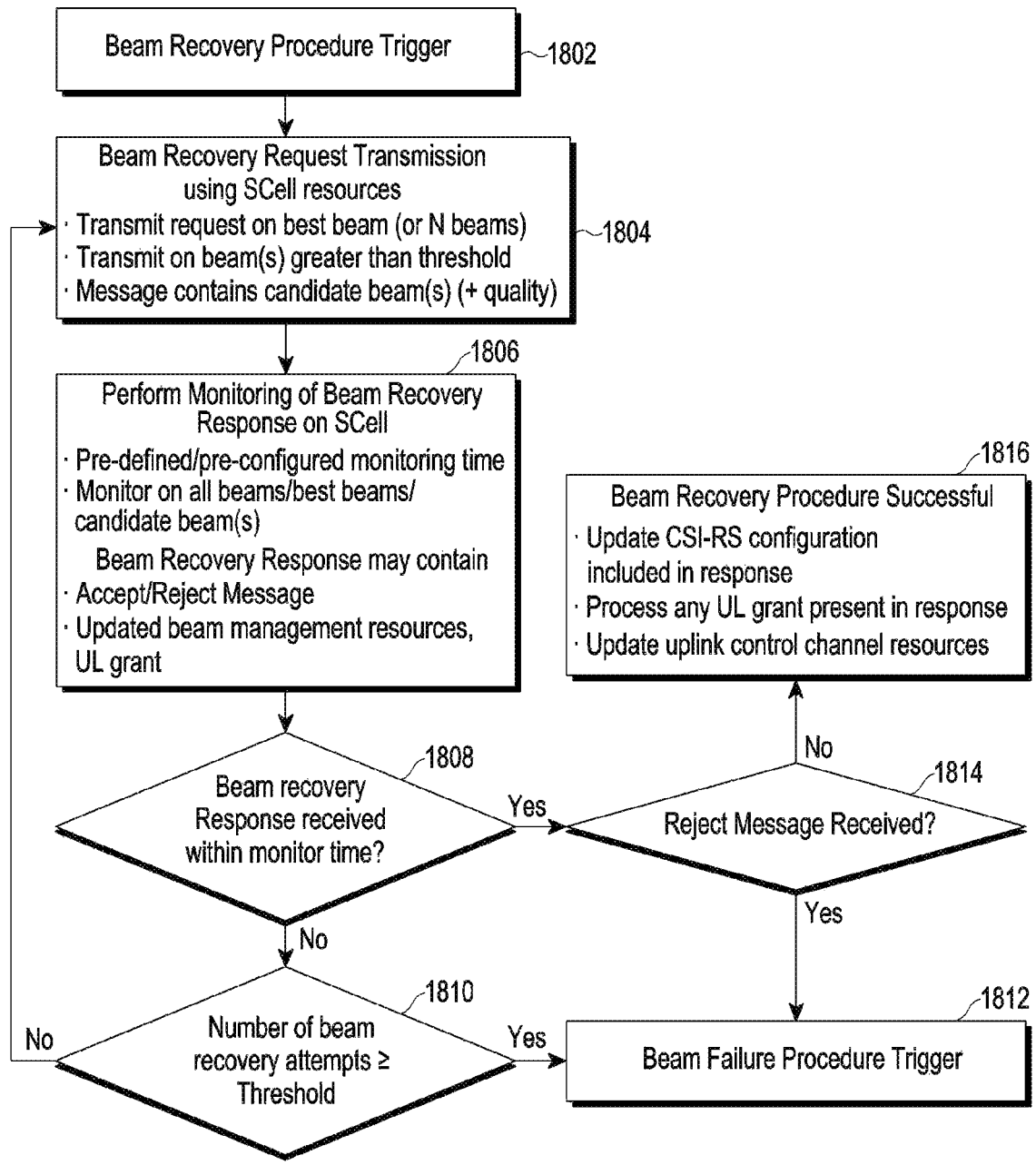
FIG. 18 illustrates the Beam Recovery Procedure, according to an alternate embodiment as disclosed herein.

FIG. 18 illustrates the Beam Recovery Procedure, according to an alternate embodiment as disclosed herein.

Beam Management Configuration Through the Configuration Module 108:

(UE 100's Capability Indication)—Referring to FIG. 12, in one embodiment of the disclosure, the UE 100 indicates the capability of the UE 100 to use different beams (or perform beam management) on different cells concurrently. The capability information includes one of following information:

1) Number of Radio Frequency (RF) chains which are supported by UE 100 and the UE 100 groups the RF chains in multiple sets. For each given set of RF chains, the UE 100 can perform independent beam management. The independent beam management comprises each of a beam selection and a beam transmission.

2) Number of RF chains which are supported by the UE 100 and the UE 100 groups the RF chains in multiple sets. For each given set of the RF chain, UE 100 may perform independent beam management (i.e. beam selection and beam transmission). For each RF chain, the UE 100 indicates one of an associated frequency band or frequency range. Table 1 below details on the UE 100 capability structure-2:

TABLE 1

| UE capability structure-2 | |
| --- | --- |
| # of RF Chains | Associated 5G Frequency Band (X) |
| # of RF Chains | Associated 5G Frequency Band (Y) |
| # of RF Chains | Associated 5G Frequency Band (Z) |

3) Number of RF chains which are supported by the UE 100 and UE 100 groups RF chains in multiple sets. For each given set of RF chain, the UE 100 may perform the independent beam management (i.e. beam selection and beam transmission). For each given set of the RF chain, the UE 100 indicates the one of the associated frequency band or the frequency range and number of beams the set of RF chain can support. Table 2 below details on the UE 100 capability structure-3:

TABLE 2

UE capability structure-3

| | | |
|---|---|---|
| # of RF Chains | Associated 5G Frequency Band (X) | Associated Number of UE Beams (N1) |
| # of RF Chains | Associated 5G Frequency Band (Y) | Associated Number of UE Beams (N2) |
| # of RF Chains | Associated 5G Frequency Band (Z) | Associated Number of UE Beams (N3) |

4) Information about different frequency bands/ranges supported by the UE 100. For each frequency band/range indicated, the UE 100 can perform independent beam management (i.e. beam selection and beam transmission)

5) Information about different frequency bands/ranges supported by UE 100. For each frequency band/range indicated, the UE 100 can perform independent beam management (i.e. beam selection and beam transmission) and the UE 100 indicates number of beams supported for the frequency band/range. Table 3 below details on the UE 100's capability structure-4:

TABLE 3

UE capability structure-4

| | |
|---|---|
| Associated 5G Frequency Band (X) | Associated Number of UE Beams (N1) |
| Associated 5G Frequency Band (Y) | Associated Number of UE Beams (N2) |
| Associated 5G Frequency Band (Z) | Associated Number of UE Beams (N3) |

Physical Downlink Control Channel (PDCCH) Configuration Through the Configuration Module 108:

In an embodiment of the disclosure, referring to FIGS. 13 and 14, the UE 100 may be configured with at least one of the User Specific PDCCH Search Space (USS) and Common PDCCH Search Space (CSS) for multiple beams of a cell. The configuration may be indicated through one of the RRC (for USS and CSS) or via System Information (for CSS). The configuration can be provided as follows:

1) Independent PDCCH search space configuration is provided per beam or per beam group for the UE 100

TABLE 4

Example of PDCCH Configuration provided per beam group

| | |
|---|---|
| PDCCH Configuration-1 | {Beam Group-X1, BeamGroup-X2, . . .} |
| PDCCH Configuration-2 | {Beam Group-Y1, BeamGroup-Y2, . . .} |
| PDCCH Configuration-3 | {Beam Group-Z1, BeamGroup-Z2, . . .} |

TABLE 5

Example of PDCCH Configuration provided per beam

| | |
|---|---|
| PDCCH Configuration-1 | {Beam-X1, Beam-X2, . . .} |
| PDCCH Configuration-2 | {Beam-Y1, Beam-Y2, . . .} |
| PDCCH Configuration-3 | {Beam-Z1, Beam-Z2, . . .} |

2) Some parameters of PDCCH search space configuration are common (common parameters) for all beams of the cell (e.g. time periodicity of USS and/or CSS, coding scheme) and configuration of uncommon parameters (other parameters) (e.g. time offset, frequency location) are provided per beam or per beam group to the UE 100

TABLE 6

Example of Partial PDCCH Configuration per Beam Group Common PDCCH Configuration for all beams in cell (e.g. Time Periodicity of USS/CSS, coding scheme)

| | |
|---|---|
| Remaining PDCCH Configuration-1 | {Beam Group-X1, BeamGroup-X2, . . .} |
| Remaining PDCCH Configuration-2 | {Beam Group-Y1, BeamGroup-Y2, . . .} |
| Remaining PDCCH Configuration-3 | {Beam Group-Z1, BeamGroup-Z2, . . .} |

TABLE 7

Example of Partial PDCCH Configuration per Beam Common PDCCH Configuration for all beams in cell (e.g. Time Periodicity of USS/CSS)

| | |
|---|---|
| Remaining PDCCH Configuration-1 | {Beam-X1, Beam-X2, . . .} |
| Remaining PDCCH Configuration-2 | {Beam-Y1, Beam-Y2, . . .} |
| Remaining PDCCH Configuration-3 | {Beam-Z1, Beam-Z2, . . .} |

3) Some parameters of PDCCH search space configuration are common (common parameters) for all beams of the cell (e.g. time periodicity of USS and/or CSS, coding scheme) and the UE 100 determines the uncommon parameters (also referred as other parameters) (e.g. time offset, frequency location) based on determination parameters (also referred as some parameter) associated with the beam (for example SS block index, CSI-RS resource identifier) where the UE 100 monitors through the monitor module 118 downlink control channel a. The PDCCH configuration parameters such as number of CORESETs, number of REGs per CORESET, number of aggregation levels, number of blind decodes, REG interleaving, DMRS locations etc. can be same or different across these configurations across the beams. The common and different configurations can be indicated separately to maintain the load of the signaling. Some of these parameters can be common within a group and some others can change within beams of a group. These can be indicated for the UE 100. On a slower time scale the RRC can configure the various parameters of each PDCCH configurations for each possible SS block beam (or other narrow beams) which will be used for PDCCH monitoring. On a PHYSICAL OR MAC LAYER signaling based time scale, the UE 100 can be indicated which exact beam to monitor for the PDCCH.

b. The location of the PDCCH such as bandwidth part where this is located may also be indicated to the UE 100. These principles can be extended for the case of group-common PDCCH as well. This should be common for a set of users. In such case, SI based indication of time-frequency location, bandwidth part etc. may be indicated to the UE 100. These can be changed in a semi-static manner.

In an embodiment of the disclosure, network indicates to UE using the Layer-1 signaling (e.g. based on beam measurement reports transmitted by UE) PDCCH configuration corresponding to which beam to be used by the UE. UE monitors only the beams which are indicated in the Layer-1 signaling. UE is required to monitor for the given Layer-1 signaling from network based on following criteria:

1) After each transmission of beam report or SRS, UE monitors for Layer-1 signaling from network for a predefined time unit (for e.g. 1 slot or 1 symbol)

2) After each transmission of beam report or SRS, UE monitors for Layer-1 signaling from network for a network configured time duration. The network can configure the time duration using RRC configuration (for e.g. using DRX configuration) or system information.

PUCCH Configuration: In an embodiment of the disclosure, UE can be configured with PUCCH resources for multiple beams. The configuration can be provided using RRC signaling or System Information as follows:

1) Independent PUCCH configuration is provided per beam or per beam group for UE

TABLE 8

Example of PUCCH Configuration provided per beam group

| | |
|---|---|
| PUCCH Configuration-1 | {Beam Group-X1, BeamGroup-X2, . . .} |
| PUCCH Configuration-2 | {Beam Group-Y1, BeamGroup-Y2, . . .} |
| PUCCH Configuration-3 | {Beam Group-Z1, BeamGroup-Z2, . . .} |

TABLE 9

Example of PUCCH Configuration provided per beam

| | |
|---|---|
| PUCCH Configuration-1 | {Beam-X1, Beam-X2, . . .} |
| PUCCH Configuration-2 | {Beam-Y1, Beam-Y2, . . .} |
| PUCCH Configuration-3 | {Beam-Z1, Beam-Z2, . . .} |

2) Some parameters of PUCCH configuration are common (common parameters) for all beams of the cell (e.g. time periodicity of PUCCH, coding scheme) and configuration of uncommon parameters (also referred as other parameters) (e.g. time offset and/or frequency location) are provided per beam or per beam group to UE

TABLE 10

Example of Partial PUCCH Configuration per Beam Group
Common PUCCH Configuration for all beams in cell (e.g.
Time Periodicity of PUCCH)

| | |
|---|---|
| Remaining PUCCH Configuration-1 | {Beam Group-X1, BeamGroup-X2, . . .} |
| Remaining PUCCH Configuration-2 | {Beam Group-Y1, BeamGroup-Y2, . . .} |

TABLE 11

Example of Partial PUCCH Configuration per Beam
Common PUCCH Configuration for all beams in cell (e.g.
Time Periodicity of PUCCH)

| | |
|---|---|
| Remaining PUCCH Configuration-1 | {Beam-X1, Beam-X2, . . .} |
| Remaining PUCCH Configuration-2 | {Beam-Y1, Beam-Y2, . . .} |

3) Some parameters of PUCCH configuration are common for all beams of the cell (e.g. time periodicity of PUCCH, coding scheme) and UE determines the uncommon parameters (e.g. time offset and/or frequency resource) based on determination parameters (also referred some parameter) associated with the beam (for example SS block index, CSI-RS resource index) where UE can transmit PUCCH.

In an embodiment of the disclosure, UE determines the beams where PUCCH can be transmitted through the transmission module 114 based on following criteria:

1) Network indicates to UE using Layer-1 signaling (e.g. based on beam measurement reports transmitted by UE) PUCCH configuration corresponding to which beams to be used by the UE. UE is required to monitor for Layer-1 signaling from network based on following criteria:

a. After each transmission of beam report or SRS, UE monitors for Layer-1 signaling from network for a predefined time unit (for e.g. 1 slot or 1 symbol)

b. After each transmission of beam report or SRS, UE monitors for Layer-1 signaling from network for a network configured time duration. The network can configure the time duration using RRC configuration (for e.g. using DRX configuration) or system information 2) UE can perform transmission of PUCCH in the uplink beams corresponding to the downlink beams where UE is required to monitor for PDCCH, if beam correspondence is applicable in the cell.

In an embodiment of the disclosure, the PUCCH resources of at least one of the SCell and the PCell can be configured as one of a periodic transmission, an aperiodic transmission or one-shot transmission. For periodic transmissions the network provides periodicity of PUCCH resource using RRC configuration. For aperiodic transmissions, network configures the PUCCH resources using dedicated RRC configuration but activation of PUCCH resources is provided by one of the Layer-1 signaling, or MAC CE signaling. The MAC CE signaling includes the PUCCH resource identity. Following parameters are configured using dedicated RRC configuration for aperiodic PUCCH resources:

1) PUCCH resource identity for e.g. PUCCH configuration index

2) Time duration for which PUCCH resource is active after receiving activation message 3) Time periodicity and timing offset of transmission of PUCCH resources 4) Frequency resource, coding parameters and format of PUCCH 5) Bandwidth part where PUCCH resources are configured.

6) Waveform for PUCCH or PUCCH format—i.e., long PUCCH or short PUCCH

7) Periodic, semi-persistent or aperiodic PUCCH resource configurations

8) PUCCH resource is used for joint reports or independent reports etc.

9) 1-symbol or 2-symbol PUCCH; 1 bit or 2 bits or greater than 2 bits as these parameters indicate the PUCCH format such as sequence-based design or repeated symbols design etc. must be indicated to the UE 10) pre-DFT scheme or post-DFT scheme to be used for PUCCH transmissions For one shot PUCCH transmission, the network provides PUCCH configuration using dedicated RRC signaling but activation of PUCCH resource is triggered using Layer-1 signaling or MAC CE signaling. The MAC CE signaling includes the PUCCH resource identity. Following parameters are configured for one shot PUCCH resource using RRC or SI signaling:

1) PUCCH resource identity for e.g. PUCCH configuration index

2) Time and frequency resource, coding parameters and format of PUCCH

3) Bandwidth part where PUCCH resources are configured.

4) Waveform for PUCCH or PUCCH format—i.e., long PUCCH or short PUCCH

5) Periodic, semi-persistent or aperiodic PUCCH resource configurations

6) PUCCH resource is used for joint reports or independent reports etc.

7) 1-symbol or 2-symbol PUCCH; 1 bit or 2 bits or greater than 2 bits as these parameters indicate the PUCCH format such as sequence-based design or repeated symbols design etc. must be indicated to the UE 8) pre-DFT scheme or post-DFT scheme to be used for PUCCH transmissions Beam Management Cell Grouping:

In an embodiment of the disclosure, the UE 100 determines multiple groups of cells called beam management groups based on one of an explicit configuration of beam management group provided by the network or based on implicit information of SCell configuration (e.g. carrier deployment, beam management configuration, etc). Each beam management group consists of cells using a same beam pair for each of the uplink transmissions and the downlink transmissions. Different beam management groups can also be defined separately for each of the uplink beam management and the downlink beam management respectively. Each beam management group is associated with a beam management group identity. UE determines the beam management groups based on one or more of the following criteria:

1) All the cells which belong to one 5G frequency band are included in the same beam management group. The beam management group identity is defined as one of the below:

a. 5G Frequency band number b. Network provides RRC configuration which maps each 5G frequency band to a beam management group identity value 2) All the cells which operate under same set of UE RF chains (as grouped under UE capability) are included in the same beam management group. The beam management group identity is defined as one of the below:

a. UE's RF chain/RF chain set identification (the RF chain/RF chain set value can be provided in UE capability)

b. Network provides RRC configuration which maps each UE's RF chain/RF chain set to a beam management group identity value 3) All the cells which are configured with same beam management resources are included in the same beam management group. Beam management resource here refer to CSI-RS resource and/or CSI-RS reporting resource and/or any other resource which is used for beam management and recovery. The beam management group identity is defined as one of the below:

a. Beam management resource set identifier, e.g. CSI-RS resource index, CSI-RS reporting index b. Network provides RRC configuration which maps each set of beam management resource to a beam management group identity value 4) All the cells which are configured to use same PUCCH resource are included in the same beam management group. Cells using same PUCCH resource here can imply cells sharing the same PUCCH format, time occasion, frequency and carrier or it can imply cells for which associated PUCCH transmission is performed in a single cell or carrier. The beam management group identity is defined as one of the below:

a. PUCCH resource index or PUCCH configuration index b. Network provides RRC configuration which maps each PUCCH resource to a beam management group identity value c. Cell index or physical cell identity or frequency number of the cell where PUCCH is transmitted 5) Network explicitly configures a beam management cell group (through the configuration module 108).

a. Beam management cell group can be configured by UE specific RRC configuration or system information or MAC CE signaling or PHYSICAL OR MAC LAYER signaling b. In the configuration, each cell is associated with a beam management group identity using the provided configuration (i.e. there is mapping between each cell and beam management group identity). All the cells belonging to same beam management group identity form one beam management group.

c. Table 12 depicts an example of network configuration (via RRC configuration) where radio resource configuration of cell (e.g. in SCell To AddMod) also includes beam management group identity. Table 13 depicts another example of network configuration (via RRC, MAC CE) to configure two beam management groups for the UE 100. In this example, for the case of RRC, separate container is defined within RRCReconfigurationMessage to indicate the beam management group. Table 14 depicts another example of network configuration (via RRC, MAC CE or Layer-1 signaling) to configure 3 beam management groups for UE. In this example, the message may contain header and tail fields containing information about other parameters or packet header. In the beam management indication field, each subfield corresponds to a cell where sub-fields are arranged in order of cell identities (for e.g. sub-filed-1 corresponds to cell index-1, sub-filed-2 corresponds to cell index-2, and so on). The entry in each sub-field indicates the beam management group identity {BMG-1, BMG-2, BMG-3}

TABLE 12

Beam Management Group Configuration using RRC (e.g. SCell To AddMod)

Cell-1 Configuration:

SCell Index

Cell Identitification: {physical cell identity, ARFCN}

Beam Management Group Identity

Radio Resource configuration

TABLE 13

Beam Management Group Configuration using RRC or MAC CE

| | |
|---|---|
| Cell-1 identity (e.g. cell index or frequency) | Beam management group id-1 |
| Cell-2 identity (e.g. cell index or frequency) | Beam management group id-2 |
| Cell-3 identity (e.g. cell index or frequency) | Beam management group id-1 |
| Cell-4 identity (e.g. cell index or frequency) | Beam management group id-2 |

TABLE 14

Beam Management Group Configuration using RRC or MA CE or Layer-1 Signaling

| Header Information | Beam Management Indication | | | | | | | | | | Tail information |
|---|---|---|---|---|---|---|---|---|---|---|---|
| XXXXX | BMG-1 | BMG-2 | BMG-3 | BMG-2 | BMG-3 | BMG-3 | BMG-1 | NA | NA | NA | YYYYY |

6) Beam management group is same as network configured PUCCH cell group.

a. One cell in the PUCCH cell group is configured with single PUCCH resource and the group contains a cell group identifier b. Network can indicate that whether the UE 100 can implicitly assume that beam management cell grouping is same as PUCCH cell group. If the UE 100 assumes that beam management cell grouping is same as PUCCH cell grouping, UE can assume the same spatial Quasi co-located (QCL) for the reception of downlink channels for all cells in a PUCCH cell group.

c. Beam management group identity is same as PUCCH cell group identifier

7) Beam management group is same as network configured Timing Alignment Group (TAG):

a. All the beams and cells in the timing alignment group share the same time alignment value b. Network can indicate that whether UE can implicitly assume that beam management cell grouping is same as TAG. If UE assumes that beam management cell grouping is same as TAG, UE can assume the same spatial QCL for the reception of downlink channels for all cells in a TAG.

c. Beam management group identity is same as TAG identifier

8) Beam management group is defined based on QCL information:

a. Network may indicate which carrier frequencies (or cells) are spatial QCL aligned with each carrier frequency (or cell) which is configured for the UE.

b. QCL information is provided as RRC configuration or system information or MAC CE signaling or Layer-1 signaling or is pre-defined c. UE groups frequencies (or cells) together which are QCL with each other d. Beam management group identity is defined as one or more of below:

QCL identifier

9) Beam management group is defined based on beam reporting configuration:

a. Network configures UE to perform combination or averaging of multiple CSI-RS resources or SS transmissions belonging to beams of different cells and report the averaged/combined result b. UE groups all the cells for which above mentioned averaging operation is performed in a single beam management group c. Beam management group identity is defined as beam reporting identity.

Beam Switching Command: In an embodiment of the disclosure, the network transmits a message to the UE 100 to change/select the beam associated with downlink or uplink control channel. The message includes new beam identity (or beam identities) to be used for uplink and/or downlink control channel and/or transmissions and also includes:

1) Beam management group identity: If the UE 100 receives beam management group identity, then the UE 100 applies the indicated beams for all the cells which belong to the indicated beam management group 2) If message for beam related configuration/indication is received using MAC CE signaling or Layer-1 signaling of downlink resources of Cell-A, the UE also applies the updated configuration included in the message to all the cells which belong to the same beam management group as Cell-A.

3) 5G frequency band indicator: If UE receives frequency band indicator, then UE applies the indicated beams for all the cells which belong to the beam management group associated with frequency band indicated in message 4) Serving cell index or identity: If the UE 100 receives serving cell index or identity value, then the UE 100 applies the indicated beams for all the cells which belong to the beam management group associated with the cell for which serving cell index or identity value indicated in message 5) Physical cell identity: Each physical cell identity is associated with a particular cell (i.e. physical cell identities are not shared between different cells configured for UE). If UE receives physical cell identity, then UE applies the indicated beams for all the cells which belong to the beam management group associated with the cell for which physical cell identity indicated in message 6) CSI-RS resource identity: Each CSI-RS resource identity is associated with a particular cell (i.e. CSI-RS resource identities are not shared between different cells configured for UE). If UE receives CSI-RS resource identity, then UE applies the indicated beams for all the cells which belong to the beam management group associated with the cell for which CSI-RS resource identity value is applicable 7) Beam group identity: Each beam group identity is associated with a particular cell (i.e. beam group identities are not shared between different cells configured for UE). If UE receives beam group identity, then UE applies the indicated beams for all the cells which belong to the beam management group associated with the cell for which beam group identity value is applicable 8) Previous beam identity: Each beam identity is associated with a particular cell (i.e. beam identities are not shared between different cells configured for UE). If UE receives previous beam identity, then UE applies the indicated beams for all the cells which belong to the beam management group associated with the cell for which provided beam identity value is applicable 9) If none of the above parameter is present, then each beam identity is associated with a particular cell (i.e. beam identities are not shared between different cells configured for UE). UE applies the indicated new beams for control channel for all the cells which belong to the beam management group associated with the cell for which new beam identity value is applicable Beam Measurements:

In an embodiment of the disclosure, following procedures are applied for all the cells belonging to a single beam management group:

1) Beam measurement corresponding to one cell can be derived based on beam measurement results of other cell belonging to same beam management group. For, e.g. UE can derive signal strength of X2 beam of cell-X based on CSI-RS resource or SS transmission of Y1 beam present in cell-Y. Relation between X2 and Y1 is derived using either network configured mapping between beams of Cell-X and beams of Cell-Y or QCL configuration or beam relation configuration between beams of Cell-X and Cell-Y or is pre-defined to UE based on a default mapping rule (for e.g. relation exists between X2 beam of Cell-X and Y1 beam of Cell-Y if beam index of X2 and Y1 are same). For beam reporting UE sends the derived result for the given beam(s). Hence, network configures beam relation between different cells and indicates if beam reporting can be performed using measurement of another beam, using RRC or MAC CE or Layer-1 signaling.

2) UE can derive measurement of a beam present in a cell by averaging beam measurement results obtained from measuring other beams belonging to cells associated with same beam management group. For, e.g. UE can derive signal strength of X2 beam of cell-X by averaging CSI-RS resource or SS transmission of Y1 beam present in cell-Y and CSI-RS resource or SS transmission of X2 beam of cell-X. Relation between X2 and Y1 is derived using either network configured mapping between beams of Cell-X and beams of Cell-Y or QCL configuration or beam relation configuration between beams of Cell-X and Cell-Y or is pre-defined to UE based on a default mapping rule (for e.g. relation exists between X2 beam of Cell-X and Y1 beam of Cell-Y if beam index of X2 and Y1 are same). For beam reporting UE sends the derived result for the given beam(s). Hence, network configures beam relation between different cells and indicates if averaged measurements can be used for beam reporting, using RRC or MAC CE or Layer-1 signaling.

3) Based on networks configuration, UE can report beam-related information per cell or per beam management cell group. If per cell reporting is triggered, UE can select beams based on the measurements per each cell, and can report the selected beam(s) with cell identities. If per beam management group is triggered, UE can select beams based on the averaged measurements from all the cells within a cell group, and can report the selected beam(s) without cell identities. The reporting should be transmitted by PUCCH or PUSCH of the cell within a beam management cell group. For, e.g. UE averages CSI-RS resource or SS transmission of Y1 beam present in cell-Y and CSI-RS resource or SS transmission of X2 beam of cell-X and report the combined result. Relation between X2 and Y1 is derived using either network configured mapping between beams of Cell-X and beams of Cell-Y or QCL configuration or beam relation configuration between beams of Cell-X and Cell-Y or is pre-defined to UE based on a default mapping rule (for e.g. relation exists between X2 beam of Cell-X and Y1 beam of Cell-Y if beam index of X2 and Y1 are same). For beam reporting UE sends the derived result for the given beam(s). Hence, network configures beam relation between different cells and indicates if averaged measurements can be used for beam reporting, using RRC or MAC CE or Layer-1 signaling.

Beam Reporting Procedure:

In one embodiment of the disclosure, UE performs measurement of primary cell's CSI-RS resource or SS resource for beam reporting of secondary cell. This is applicable for the case when the SCell is spatially QCL with the primary cell. The QCL indication can be provided by the cellular network using RRC configuration, MAC CE signaling or Layer-1 signaling.

In an embodiment of the disclosure, following information is included in beam report:

1) UE reports CSI-RS measurements if there exists at least 'K' CSI-RS resources for which signal strength is greater than a threshold, else UE reports SS measurements of SCell. The threshold can be pre-defined or can be configured by the network using RRC configuration, system information, MAC CE signaling or Layer-1 signaling. Value of 'K' can be pre-configured (for e.g. value of 'K' can be 1), or can be configured by network using RRC configuration, system information, MAC CE signaling or Layer-1 signaling.

2) UE reports CSI-RS measurements if there exists at least 'K' CSI-RS resources which can be detected by the UE, else UE reports SS measurements of SCell. Value of 'K' can be pre-defined (for e.g. value of 'K' can be 1), or can be configured by network using RRC configuration, system information, MAC CE signaling or Layer-1 signaling.

In an embodiment of the disclosure, one or more of following criteria is used by the UE 100 to transmit beam reports to network for a SCell:

1) If signal strength of all the beams in the report are less than a threshold then use beam reporting resource of PCell (e.g. PUCCH/PUSCH of PCell), else uses the reporting resource configured for UE (i.e. either SCell PUCCH/PUSCH or PCell PUCCH/PUSCH). The value of threshold is configured by the network using RRC configuration. MAC CE signaling or Layer-1 signaling 2) If UE is reporting the CSI-RS of the SCell, then use the reporting resource configured for UE (i.e. either SCell PUCCH/PUSCH or PCell PUCCH/PUSCH), else if UE is reporting SS measurements of SCell then use beam reporting resource of PCell (i.e. PUCCH/PUSCH of PCell).

In an embodiment of the disclosure, UE continues performing beam measurements and beam reporting procedure based on CSI-RS resources and/or SS transmission of SCell, after beam recovery and/or failure is triggered on the same SCell, if the beam reporting resources are present and available in PCell (e.g. PUCCH/PUSCH of PCell). Else UE stops the beam measurement and beam reporting procedure for the given SCell if beam recovery and/or failure is triggered.

In an Embodiment, Beam Recovery Procedure (Method 500) Providing Request on PCell and Response on PCell is Described Below:

In one embodiment of the disclosure, following procedure is used for beam recovery as depicted in FIG. 15:

1) As shown in step 1502, the UE 100 transmits beam recovery request using the resource of PCell (e.g. PUCCH/PUSCH/RACH). UE can be configured by cellular network with one or more beam recovery request resources for one or more secondary cells (as shown in step 1504). Each beam recovery request resource is associated with an identity of the secondary cell, wherein the identity of the secondary cell comprises at least one of a secondary cell index, Absolute Radio Frequency Channel Number (ARFCN), physical cell identity, a secondary cell identity. Secondary cell identity can be either explicitly provided along with each beam recovery request resource configuration, or can be implicitly associated with beam recovery request resource by including beam recovery request resource configuration within a secondary cell configuration container, or by including beam recovery request resource configuration along with beam measurement resource configuration associated to the given secondary cell, or by including beam measurement resource configuration identity within the beam recovery request resource configuration, or by including beam recovery request resource configuration identity within the beam measurement resource configuration.

2) As shown in steps 1506 to 1512, the beam recovery request contains identity of the candidate beam(s) of SCell (e.g. SS block index or CSI-RS resource index). SCell identity can indicated to network using implicit method (e.g. using uplink resources configured for a specific SCell) or by explicitly including SCell information in the beam recovery request (e.g. cell index, physical cell identity, carrier information of SCell, beam group identity of candidate beam, CSI-RS resource identity of candidate beam). UE may also include UE identity if contention-based (shared resources) are used for beam recovery request transmission. UE may also include the quality of candidate beam(s). Beam recovery response can contain scheduling request indication. Candidate beam(s) is/are selected by UE based on following criteria:

a. Best beam of SCell based on quality of CSI-RS or SS transmission b. Best N beams of SCell based on quality of CSI-RS or SS transmission. N is either predefined in specification or is configured by the network using dedicated RRC configuration or system information or is UE implementation specific.

c. All beams of SCell which have quality of CSI-RS or SS transmission greater than a threshold. Threshold is either predefined in specification or is configured by the network using dedicated RRC configuration or system information or is UE implementation specific.

3) After transmission of beam recovery request, UE monitors for beam recovery response from network on PCell resources (e.g. beam link(s) associated with downlink control channel resources of PCell). UE monitors for a time duration which is either pre-defined or configured by the network using dedicated RRC configuration or provided in system information.

4) If UE receives beam recovery response from network before monitoring time expires:

a. Beam recovery response can indicate either rejection message or accept message (as shown in step 1514)

b. Beam recovery response message indicates identity of SCell either explicitly (e.g. including physical cell identity, SCell index, carrier information of SCell, beam group identity of candidate beam, CSI-RS resource identity of candidate beam) or implicitly (e.g. by using SCell specific downlink control channel).

c. If beam recovery response indicates reject message, then UE stops performing beam recovery request transmission for SCell and beam failure is triggered d. Else:

i. UE applies any updated CSI-RS configuration (e.g. CSI-RS resource update) provided in network response message ii. UE updates any uplink control channel resource configuration (e.g. beam change) provided in beam recovery response message iii. UE processes any uplink grant received in beam recovery response message iv. UE starts monitoring beam link indicated for downlink control channel in the beam recovery response message (as shown in step 1516)

5) Else:

a. If number of beam recovery attempts is greater than or equal to a threshold which is either pre-defined or is configured by the network using dedicated RRC configuration or provided using system information, then beam failure is triggered b. Else, UE performs retransmission of beam recovery request and follows procedure starting from step 1.

In an Alternate Embodiment, the Beam Recovery Procedure Provides Request on PCell and Response on SCell:

In an embodiment of the disclosure, following procedure is used for beam recovery as depicted in FIG. 16:

1) As shown in step 1602, the UE 100 transmits beam recovery request using the resource of PCell (e.g. PUCCH/PUSCH/RACH). UE can be configured by cellular network with one or more beam recovery request resources for one or more secondary cells (as shown in step 1604). Each beam recovery request resource is associated with an identity of the secondary cell, wherein the identity of the secondary cell comprises at least one of a secondary cell index, Absolute Radio Frequency Channel Number (ARFCN), physical cell identity, a secondary cell identity. Secondary cell identity can be either explicitly provided along with each beam recovery request resource configuration, or can be implicitly associated with beam recovery request resource by including beam recovery request resource configuration within a secondary cell configuration container, or by including beam recovery request resource configuration along with beam measurement resource configuration associated to the given secondary cell, or by including beam measurement resource configuration identity within the beam recovery request resource configuration, or by including beam recovery request resource configuration identity within the beam measurement resource configuration.

2) The beam recovery request contains identity of the candidate beam(s) of SCell (e.g. SS block index or CSI-RS resource index). SCell identity can indicated to network using implicit method (e.g. using uplink resources configured for a specific SCell) or by explicitly including SCell information in the beam recovery request (e.g. cell index, physical cell identity, carrier information of SCell, beam group identity, CSI-RS resource identity). UE may also include UE identity if shared resources are used for beam recovery request transmission. UE may also include the quality of candidate beam(s). Beam recovery response can contain scheduling request indication. Candidate beam(s) is/are selected by UE based on following criteria:

a. Best beam of SCell based on quality of CSI-RS or SS transmission b. Best N beams of SCell based on quality of CSI-RS or SS transmission. N is either predefined in specification or is configured by the network using dedicated RRC configuration or system information or is UE implementation specific.

c. All beams of SCell which have quality of CSI-RS or SS transmission greater than a threshold. Threshold is either predefined in specification or is configured by the network using dedicated RRC configuration or system information or is UE implementation specific.

3) As shown in step 1606 to 1610, after transmission of beam recovery request, UE monitors for beam recovery response from network on SCell downlink resources. UE monitors for a time duration which is either pre-defined or configured by the network using dedicated RRC configuration or provided in system information. Network may transmit and UE monitors one of following beams of SCell for beam recovery response:

a. All beams of SCell b. Best N beams of SCell where N is either predefined in specification or is configured by the network using dedicated RRC configuration or system information or is UE implementation specific c. All beams of SCell which have quality of CSI-RS or SS transmission greater than a threshold. Threshold is either predefined in specification or is configured by the network using dedicated RRC configuration or system information or is UE implementation specific.

d. Only the candidate beams provided in beam recovery request message e. Candidate beam provided in beam recovery request which has best quality 4) As shown in steps 1614, if UE receives beam recovery response from network before monitoring time expires:

a. Beam recovery response can indicate either rejection message or accept message b. If beam recovery response indicates reject message, then UE stops performing beam recovery request transmission for SCell and beam failure is triggered c. Else:

i. UE applies any updated CSI-RS configuration (e.g. CSI-RS resource update) provided in network response message ii. UE updates any uplink control channel resource configuration (e.g. beam change) provided in beam recovery response message iii. UE processes any uplink grant received in beam recovery response message d. UE starts monitoring beam link for downlink control channel corresponding to:

i. Beam link is indicated in the beam recovery response message ii. Beam link is the same beam where UE received beam recovery response 5) Else:

a. If number of beam recovery attempts is greater than or equal to a threshold which is either pre-defined or is configured by the network using dedicated RRC configuration or provided using system information, then beam failure is triggered b. Else, UE performs retransmission of beam recovery request and follows procedure starting from step 1 (as shown in step 1616).

In an Alternate Embodiment, the Beam Recovery Procedure Comprises Request on SCell and Response on PCell:

In an embodiment of the disclosure, following procedure is used for beam recovery as depicted in FIG. 17:

1) As shown in step 1702, the UE 100 transmits beam recovery request using the resource of SCell (e.g. PUCCH or RACH or beam recovery request resources configured for SCell). UE can be configured by cellular network with one or more beam recovery request resources for one or more secondary cells (as shown in step 1704). Each beam recovery request resource is associated with an identity of the secondary cell, wherein the identity of the secondary cell comprises at least one of a secondary cell index, Absolute Radio Frequency Channel Number (ARFCN), physical cell identity, a secondary cell identity. Secondary cell identity can be either explicitly provided along with each beam recovery request resource configuration, or can be implicitly associated with beam recovery request resource by including beam recovery request resource configuration within a secondary cell configuration container, or by including beam recovery request resource configuration along with beam measurement resource configuration associated to the given secondary cell, or by including beam measurement resource configuration identity within the beam recovery request resource configuration, or by including beam recovery request resource configuration identity within the beam measurement resource configuration.

2) UE selects beams for transmission of beam recovery request as follows:

a. Best beam of SCell based on quality of CSI-RS or SS transmission b. Best N beams of SCell based on quality of CSI-RS or SS transmission. N is either predefined in specification or is configured by the network using dedicated RRC configuration or system information or is UE implementation specific.

c. All beams of SCell which have quality of CSI-RS or SS transmission greater than a threshold. Threshold is either predefined in specification or is configured by the network using dedicated RRC configuration or system information or is UE implementation specific.

3) As shown in steps 1706 to 1710, the beam recovery request contains identity of the candidate beam(s) of SCell (e.g. SS block index or CSI-RS resource index). UE may also include UE identity if shared resources are used for beam recovery request transmission. UE may also include the quality of candidate beam(s).

4) After transmission of beam recovery request, UE monitors for beam recovery response from network on PCell resources (e.g. beam link(s) associated with downlink control channel resources of PCell). UE monitors for a time duration which is either pre-defined or configured by the network using dedicated RRC configuration or provided in system information.

5) As shown in step 1714, if the UE 100 receives beam recovery response from network before monitoring time expires:

a. Beam recovery response can indicate either rejection message or accept message b. Beam recovery response message indicates identity of SCell either explicitly (e.g. including physical cell identity, SCell index, carrier information of SCell, beam group identity of candidate beam, CSI-RS resource identity of candidate beam) or implicitly (e.g. by using SCell specific downlink control channel)

c. If beam recovery response indicates reject message, then UE stops performing beam recovery request transmission for SCell and beam failure is triggered a. Else:

i. UE 100 applies any updated CSI-RS configuration (e.g. CSI-RS resource update) provided in network response message ii. UE 100 updates any uplink control channel resource configuration (e.g. beam change) provided in beam recovery response message iii. UE 100 processes any uplink grant received in beam recovery response message iv. UE 100 starts monitoring beam link indicated for downlink control channel in the beam recovery response message 6) Else:

a. If number of beam recovery attempts is greater than or equal to a threshold which is either pre-defined or is configured by the network using dedicated RRC configuration or provided using system information, then beam failure is triggered b. Else, UE 100 performs retransmission of beam recovery request and follows procedure starting from step 1.

In an embodiment, the beam recovery procedure comprises Request on SCell and Response on SCell (as shown in step 1716):

In an Alternate Embodiment, the Beam Recovery Procedure Comprises Request on SCell and Response on SCell:

In an embodiment of the disclosure, following procedure is used for beam recovery as depicted in FIG. 18:

1) As shown in step 1802, the UE 100 transmits beam recovery request using the resource of SCell (e.g. PUCCH or RACH or beam recovery request resources configured for SCell). UE can be configured by cellular network with one or more beam recovery request resources for one or more secondary cells (as shown in step 1804). Each beam recovery request resource is associated with an identity of the secondary cell, wherein the identity of the secondary cell comprises at least one of a secondary cell index, Absolute Radio Frequency Channel Number (ARFCN), physical cell identity, a secondary cell identity. Secondary cell identity can be either explicitly provided along with each beam recovery request resource configuration, or can be implicitly associated with beam recovery request resource by including beam recovery request resource configuration within a secondary cell configuration container, or by including beam recovery request resource configuration along with beam measurement resource configuration associated to the given secondary cell, or by including beam measurement resource configuration identity within the beam recovery request resource configuration, or by including beam recovery request resource configuration identity within the beam measurement resource configuration.

2) UE 100 select beams for transmission of beam recovery request as follows:
   a. Best beam of SCell based on quality of CSI-RS or SS transmission
   b. Best N beams of SCell based on quality of CSI-RS or SS transmission. N is either predefined in specification or is configured by the network using dedicated RRC configuration or system information or is UE implementation specific.
   c. All beams of SCell which have quality of CSI-RS or SS transmission greater than a threshold. Threshold is either predefined in specification or is configured by the network using dedicated RRC configuration or system information or is UE 100 implementation specific.

3) The beam recovery request contains identity of the candidate beam(s) of SCell (e.g. SS block index or CSI-RS resource index). UE may also include UE 100 identity if shared resources are used for beam recovery request transmission. UE 100 may also include the quality of candidate beam(s).

4) After transmission of beam recovery request, UE 100 monitors for beam recovery response from network on SCell downlink resources. UE 100 monitors for a time duration which is either pre-defined or configured by the network using dedicated RRC configuration or provided in system information. Network may transmit and UE 100 monitors one of following beams of SCell for beam recovery response:
   a. All beams of SCell
   b. Best N beams of SCell where N is either predefined in specification or is configured by the network using dedicated RRC configuration or system information or is UE implementation specific
   c. All beams of SCell which have quality of CSI-RS or SS transmission greater than a threshold. Threshold is either predefined in specification or is configured by the network using dedicated RRC configuration or system information or is UE implementation specific.
   d. Only the candidate beams provided in beam recovery request message
   e. Candidate beam provided in beam recovery request which has best quality
   f. Only the downlink beams corresponding to the uplink beams where beam recovery request is transmitted (if beam correspondence is applicable)

5) As shown in steps 1806 to 1810, if the UE 100 receives beam recovery response from network before monitoring time expires:
   a. Beam recovery response can indicate either rejection message or accept message
   b. If beam recovery response indicates reject message, then UE 100 stops performing beam recovery request transmission for SCell and beam failure is triggered (as shown in 1814).
   c. Else:
   i. UE 100 applies any updated CSI-RS configuration (e.g. CSI-RS resource update) provided in network response message
   ii. UE 100 updates any uplink control channel resource configuration (e.g. beam change) provided in beam recovery response message
   iii. UE 100 processes any uplink grant received in beam recovery response message
   d. UE 100 starts monitoring beam link for downlink control channel corresponding to:
   i. Beam link is indicated in the beam recovery response message
   ii. Beam link is the same beam where UE 100 received beam recovery response (as shown in step 1816)

6) Else:
   a. If number of beam recovery attempts is greater than or equal to a threshold which is either pre-defined or is configured by the network using dedicated RRC configuration or provided using system information, then beam failure is triggered
   b. Else, UE 100 performs retransmission of beam recovery request and follows procedure starting from step 1.

In an Alternate Embodiment, the Beam Recovery Procedure Comprises Request on PCell or SCell and Response on One of {PCell, SCell, PCell or SCell}:

In an embodiment, following procedure is used for beam recovery:

1) UE can transmit beam recovery request using either the resource of PCell (e.g. PUCCH/PUSCH/RACH) or resource of SCell (e.g. PUCCH or RACH or beam recovery request resources configured for SCell). UE can be configured by cellular network with one or more beam recovery request resources for one or more secondary cells, wherein each beam recovery request resource is associated with an identity of the secondary cell, wherein the identity of the secondary cell comprises at least one of a secondary cell index, Absolute Radio Frequency Channel Number (ARFCN), physical cell identity, a secondary cell identity. Secondary cell identity can be either explicitly provided along with each beam recovery request resource configuration, or can be implicitly associated with beam recovery request resource by including beam recovery request resource configuration within a secondary cell configuration container, or by including beam recovery request resource configuration along with beam measurement resource configuration associated to the given secondary cell, or by including beam measurement resource configuration identity within the beam recovery request resource configuration, or by including beam recovery request resource configuration identity within the beam measurement resource configuration. UE selects beam recovery request resources based on one or more of following criteria:
   a. Network configures the UE to transmit beam recovery request using PCell resources or using SCell resources. The configuration is provided using dedicated RRC configuration or system information or MAC CE signaling or Layer-1 signaling b. The priority order for beam recovery request transmission is SCell beam recovery request resources>SCell PUCCH>SCell RACH>PCell PUCCH>PCell RACH. If highest priority resource is not configured or not available then next lowest priority resource is used.

c. The priority order for beam recovery request transmission is SCell beam recovery request resources>SCell PUCCH>PCell PUCCH>SCell RACH>PCell RACH. If highest priority resource is not configured or not available then next lowest priority resource is used.

d. The priority order for beam recovery request transmission is PCell PUCCH>SCell beam recovery request resources>SCell PUCCH>SCell RACH>PCell RACH. If highest priority resource is not configured or not available then next lowest priority resource is used.

e. The priority order for beam recovery request transmission is SCell beam recovery request resources>PCell PUCCH>SCell PUCCH>SCell RACH>PCell RACH. If highest priority resource is not configured or not available then next lowest priority resource is used.

f. The priority order for beam recovery request transmission is SCell PUCCH>SCell beam recovery request resources>SCell RACH>PCell PUCCH>PCell RACH. If highest priority resource is not configured or not available then next lowest priority resource is used.

g. The priority order for beam recovery request transmission is SCell PUCCH>SCell beam recovery request resources>PCell PUCCH>SCell RACH>PCell RACH. If highest priority resource is not configured or not available then next lowest priority resource is used.

h. The priority order for beam recovery request transmission is PCell PUCCH>SCell PUCCH>SCell beam recovery request resources>SCell RACH>PCell RACH. If highest priority resource is not configured or not available then next lowest priority resource is used.

i. The priority order for beam recovery request transmission is SCell PUCCH>PCell PUCCH>SCell beam recovery request resources>SCell RACH>PCell RACH. If highest priority resource is not configured or not available then next lowest priority resource is used.

2) If beam recovery request is transmitted using PCell resources, the beam recovery request contains identity of the candidate beam(s) of SCell (e.g. SS block index or CSI-RS resource index). SCell identity can indicated to network using implicit method (e.g. using uplink resources configured for a specific SCell) or by explicitly including SCell information in the beam recovery request (e.g. cell index, physical cell identity, carrier information of SCell, beam group identity of candidate beam, CSI-RS resource identity of candidate beam). UE may also include UE identity if shared resources are used for beam recovery request transmission. UE may also include the quality of candidate beam(s). Beam recovery response can contain scheduling request indication. Candidate beam(s) is/are selected by UE based on following criteria:

a. Best beam of SCell based on quality of CSI-RS or SS transmission b. Best N beams of SCell based on quality of CSI-RS or SS transmission. N is either predefined in specification or is configured by the network using dedicated RRC configuration or system information or is UE implementation specific.

c. All beams of SCell which have quality of CSI-RS or SS transmission greater than a threshold. Threshold is either predefined in specification or is configured by the network using dedicated RRC configuration or system information or is UE implementation specific.

3) Else if beam recovery request is transmitted using SCell resources:

a. UE transmits beam recovery request using the resource of SCell (e.g. PUCCH or RACH or beam recovery request resources configured for SCell). UE selects beams for transmission of beam recovery request as follows:

i. Best beam of SCell based on quality of CSI-RS or SS transmission ii. Best N beams of SCell based on quality of CSI-RS or SS transmission. N is either predefined in specification or is configured by the network using dedicated RRC configuration or system information or is UE implementation specific.

iii. All beams of SCell which have quality of CSI-RS or SS transmission greater than a threshold. Threshold is either predefined in specification or is configured by the network using dedicated RRC configuration or system information or is UE implementation specific.

b. The beam recovery request contains identity of the candidate beam(s) of SCell (e.g. SS block index or CSI-RS resource index). UE may also include UE identity is shared resources are used for beam recovery request transmission. UE may also include the quality of candidate beam(s).

Request on PCell or SCell and Response on One of PCell:

4a) After transmission of beam recovery request, UE monitors for beam recovery response from network on PCell resources (e.g. beam link(s) associated with downlink control channel resources of PCell). UE monitors for a time duration which is either pre-defined or configured by the network using dedicated RRC configuration or provided in system information.

5a) If UE receives beam recovery response from network before monitoring time expires:

a. Beam recovery response can indicate either rejection message or accept message b. Beam recovery response message indicates identity of SCell either explicitly (e.g. including physical cell identity, SCell index, carrier information of SCell, beam group identity of candidate beam, CSI-RS resource identity of candidate beam) or implicitly (e.g. by using SCell specific downlink control channel)

c. If beam recovery response indicates reject message, then UE stops performing beam recovery request transmission for SCell and beam failure is triggered d. Else:

i. UE applies any updated CSI-RS configuration (e.g. CSI-RS resource update) provided in network response message ii. UE updates any uplink control channel resource configuration (e.g. beam change) provided in beam recovery response message iii. UE processes any uplink grant received in beam recovery response message iv. UE starts monitoring beam link indicated for downlink control channel in the beam recovery response message 6a) Else:

a. If number of beam recovery attempts is greater than or equal to a threshold which is either pre-defined or is configured by the network using dedicated RRC configuration or provided using system information, then beam failure is triggered b. Else, UE performs retransmission of beam recovery request and follows procedure starting from step 1.

Request on PCell or SCell and Response on one of SCell:

4b) After transmission of beam recovery request, UE monitors for beam recovery response from network on SCell downlink resources. UE monitors for a time duration which is either pre-defined or configured by the network using dedicated RRC configuration or provided in system information. Network may transmit and UE monitors one of following beams of SCell for beam recovery response:
  a. All beams of SCell
  b. Best N beams of SCell where N is either predefined in specification or is configured by the network using dedicated RRC configuration or system information or is UE implementation specific
  c. All beams of SCell which have quality of CSI-RS or SS transmission greater than a threshold. Threshold is either predefined in specification or is configured by the network using dedicated RRC configuration or system information or is UE implementation specific.
  d. Only the candidate beams provided in beam recovery request message
  e. Candidate beam provided in beam recovery request which has best quality
  f. Only the downlink beams corresponding to the uplink beams where beam recovery request is transmitted (if beam correspondence is applicable)

5b) If UE receives beam recovery response from network before monitoring time expires:
  a. Beam recovery response can indicate either rejection message or accept message
  b. If beam recovery response indicates reject message, then UE stops performing beam recovery request transmission for SCell and beam failure is triggered
  c. Else:
    i. UE applies any updated CSI-RS configuration (e.g. CSI-RS resource update) provided in network response message
    ii. UE updates any uplink control channel resource configuration (e.g. beam change) provided in beam recovery response message
    iii. UE processes any uplink grant received in beam recovery response message
  d. UE starts monitoring beam link for downlink control channel corresponding to:
    i. Beam link is indicated in the beam recovery response message
    ii. Beam link is the same beam where UE received beam recovery response 6b) Else:
  a. If number of beam recovery attempts is greater than or equal to a threshold which is either pre-defined or is configured by the network using dedicated RRC configuration or provided using system information, then beam failure is triggered
  b. Else, UE performs retransmission of beam recovery request and follows procedure starting from step 1.

Request on PCell or SCell and Response on One of PCell or SCell:

4c) After transmission of beam recovery request, UE 100 monitors for beam recovery response from network on either SCell downlink resources of PCell downlink resources. UE selects one of the resources based on one or more of following criteria:
  a. Network configures the UE to monitor for beam recovery request on PCell resources or on SCell resources. The configuration is provided using dedicated RRC configuration or system information or MAC CE signaling or Layer-1 signaling
  b. UE monitors for beam recovery response on both PCell resources as well as SCell resources
  c. UE monitors for beam recovery response on PCell resource if beam recovery request is transmitted using PCell resource and UE monitors for beam recovery response on SCell resource if beam recovery request is transmitted using SCell resource 5c) If UE monitors for beam recovery response from network on SCell downlink resources, UE monitors for a time duration which is either pre-defined or configured by the network using dedicated RRC configuration or provided in system information. Network may transmit and UE monitors one of following beams of SCell for beam recovery response:
  a. All beams of SCell
  b. Best N beams of SCell where N is either predefined in specification or is configured by the network using dedicated RRC configuration or system information or is UE implementation specific
  c. All beams of SCell which have quality of CSI-RS or SS transmission greater than a threshold. Threshold is either predefined in specification or is configured by the network using dedicated RRC configuration or system information or is UE implementation specific.
  d. Only the candidate beams provided in beam recovery request message
  e. Candidate beam provided in beam recovery request which has best quality
  f. Only the downlink beams corresponding to the uplink beams where beam recovery request is transmitted (if beam correspondence is applicable)

6c) Else if UE monitors for beam recovery response from network on PCell resources (e.g. beam link(s) associated with downlink control channel resources of PCell), UE monitors for a time duration which is either pre-defined or configured by the network using dedicated RRC configuration or provided in system information.

7c) If UE receives beam recovery response from network before monitoring time expires:
  a. Beam recovery response received can indicate either rejection message or accept message
  b. When received from PCell, beam recovery response message indicates identity of SCell either explicitly (e.g. including physical cell identity, SCell index, carrier information of SCell, beam group identity of candidate beam, CSI-RS resource identity of candidate beam) or implicitly (e.g. by using SCell specific downlink control channel)
  c. If beam recovery response indicated reject message then UE stops performing beam recovery request transmission for SCell and beam failure is triggered
  d. Else:
    i. UE applies any updated CSI-RS configuration (e.g. CSI-RS resource update) provided in network response message
    ii. UE updates any uplink control channel resource configuration (e.g. beam change) provided in beam recovery response message
    iii. UE processes any uplink grant received in beam recovery response message
    iv. UE starts monitoring beam link indicated for downlink control channel in the beam recovery response message 8c) Else:
  a. If number of beam recovery attempts is greater than or equal to a threshold which is either pre-defined or is configured by the network using dedicated RRC configuration or provided using system information, then beam failure is triggered
  b. Else, UE performs retransmission of beam recovery request and follows procedure starting from step 1.

(as shown in steps 1614 and 1616), in an embodiment, the Beam Failure Procedure is described below: In an embodiment of the disclosure, when beam failure is triggered on SCell following procedure is performed by UE:

1) UE stops performing beam recovery request transmission for SCell after detection of beam failure, if one of more of following criteria are met:
   a. If higher layer indicates to stop beam recovery procedure on SCell, which can be indicated when SCell is released or suspended or modified
   b. UE receives beam recovery response from network for the SCell. If beam recovery response indicates successful completion of beam recovery then UE sends indication to higher layer of successful completion of beam recovery on SCell
   d. In another variant of the solution, UE always stops beam recovery request transmission on SCell
2) UE stops transmission of any uplink transmissions on SCell
3) UE releases all uplink control channel resources on SCell
4) UE stops monitoring beam link associated with downlink control channel of SCell
5) UE sends indication to higher layers of beam failure on SCell
6) Upper layers (RRC) after receiving indication from UE:
   a. UE suspends transmission using SCell resources
   b. UE initiates a RRC timer. The timer length is configured by dedicated RRC configuration or by system information.
   c. If UE receives indication from lower layer indication successful completion of beam recovery on SCell, UE stops the RRC timer and resumes SCell resources and transmissions
   d. After expiry of RRC timer:
      i. UE releases SCell autonomously
      ii. UE sends RRC message to network indicating release of SCell along with the identity of SCell and available measurement results (including beam results) of SCell In an embodiment of the disclosure, when beam failure is triggered on SCell following procedure is performed by UE:

1) UE stops performing beam recovery request transmission for SCell after beam failure detection, if one of more of following criteria are met:
   a. If higher layer indicates to stop beam recovery procedure on SCell, which can be indicated when SCell is released or suspended or modified
   b. UE receives beam recovery response from network for the SCell. If beam recovery response indicates successful completion of beam recovery then UE sends indication to higher layer of successful completion of beam recovery on SCell
   c. In another variant of the solution, UE always stops beam recovery request transmission on SCell
2) UE stops transmission of any uplink transmissions on SCell
3) UE releases all uplink control channel resources on SCell
4) UE stops monitoring beam link associated with downlink control channel of SCell
5) UE sends indication to higher layers of beam failure on SCell
6) Upper layers (RRC) after receiving indication from UE:
   a. UE suspends transmission using SCell resources
   b. UE sends RRC message to network indicating beam failure of SCell along with the identity of SCell and available measurement results (including beam results) of SCell
   c. UE initiates a RRC timer. The timer length is configured by dedicated RRC configuration or by system information.
   d. If UE receives indication from lower layer indication successful completion of beam recovery on SCell, UE stops the RRC timer and resumes SCell resources and transmissions
   e. If UE receives RRC reconfiguration message from the network indicating SCell modification or SCell release, then UE stops the RRC timer and performs actions on SCell according to command receive from network
   f. After expiry of RRC timer:
      UE releases SCell autonomously In an embodiment of the disclosure, when beam failure is triggered on SCell following procedure is performed by UE:

1) UE stops performing beam recovery request transmission for SCell after beam failure detection, if one of more of following criteria are met:
   a. If higher layer indicates to stop beam recovery procedure on SCell, which can be indicated when SCell is released or suspended or modified
   b. UE receives beam recovery response from network for the SCell. If beam recovery response indicates successful completion of beam recovery then UE sends indication to higher layer of successful completion of beam recovery on SCell
   c. In another variant of the solution, UE always stops beam recovery request transmission on SCell
2) UE stops transmission of any uplink transmissions on SCell
3) UE releases all uplink control channel resources on SCell
4) UE stops monitoring beam link associated with downlink control channel of SCell
5) UE sends Physical Layer or MAC layer or Radio Resource Control (RRC) message to network using PCell resources (e.g. PUCCH/PUSCH) indicating beam failure of SCell along with the
   a. Identity of SCell
   b. Best candidate beam(s) of SCell and quality of beams
   c. Measurement results associated with SSB or CSI-RS configured to UE for measurements Other Configurations for the CA Framework and Beam Management:

In LTE, 4 timing alignment groups are supported by means of 2 bits in MAC PDU sent for the TA indication. This is done to support timing differences between the PCell and SCell and to support various CA deployments. Current MAC PDU sending the TA value is following:

TABLE 15

| TAG index (2 bits) | TA Value |
|---|---|

The UE as part of the RAR sent on SCell is indicated the TAG it belongs to as shown in figure below. For ease, all steps of RACH procedure are not indicated. For all cells in one TAG, the UE will use the same TA value for its UL transmissions. The number of TAGs supported also depends on the UE capability and the UE CA capability. This issue is also prominent for supporting CA with sub-6 GHz and above 6 GHz networks where the BW is limited in sub-6 GHz networks and massive reports cannot be supported by PUCCH on the lower frequency networks.

Figure 19:
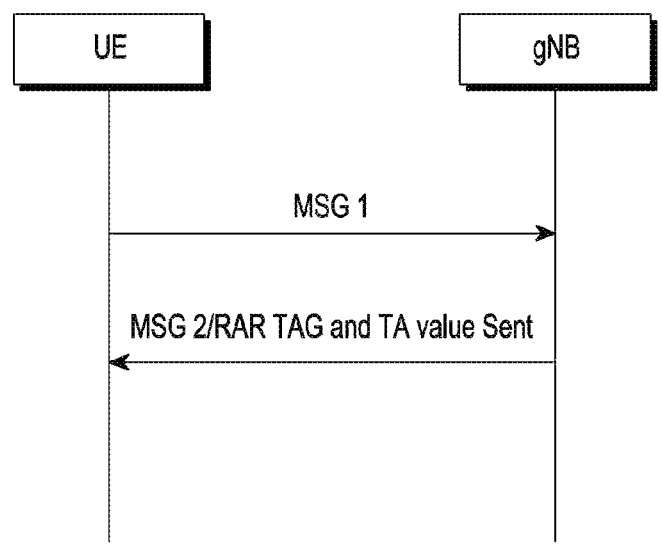
FIG. 19 illustrates Msg1 and Msg2 of a typical RACH procedure, according to embodiments as disclosed herein.

FIG. 19 illustrates Msg1 and Msg2 of a typical RACH procedure, according to embodiments as disclosed herein.

The UE 100 transmits the MSG 1 to gNB and receives each of the MSG2, an RAR TAG and TA value.

Figure 20:
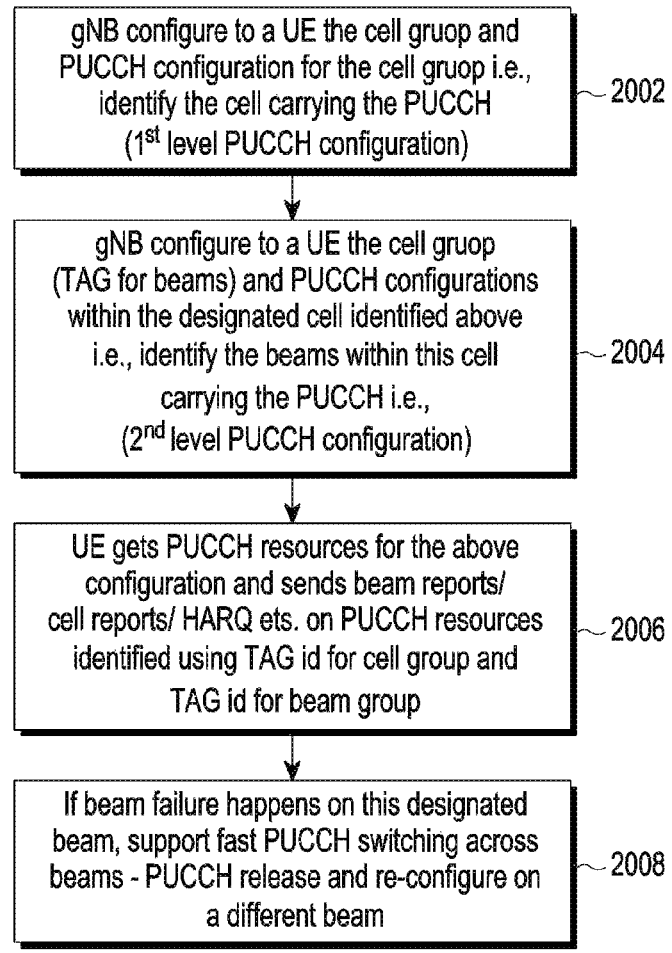
FIG. 20 illustrates flow chart to describe the PUCCH configurations for the CA and beamforming based on TAG, according to embodiments as disclosed herein.

FIG. 20 illustrates flow chart to describe the PUCCH configurations for the CA and beamforming based on the TAG, according to embodiments as disclosed herein.

Referring to FIG. 20, as shown in steps 2002, 2004, 2006 and 2008, the gNB may configure PUCCH resources across cells and beam groups.

At step 2002, the gNB configures to the UE 100, the cell group and PUCCH configuration for the cell group. The gNB identifies the cell carrying the PUCCH ($1^{st}$ level PUCCH configuration). At step 2004, the gNB configures to the UE 100, the beam group (TAG for beams) and PUCCH configurations within designated cells identified above in step 2002. The gNB identifies the beams within the cell carrying the PUCCH ($2^{nd}$ level PUCCH configuration).

At step 2006, the UE 100 gets the PUCCH resources for the configuration discussed above in step 2004, and sends one of the beam measurement reports, the cell reports, or Hybrid automatic repeat request (HARM) on PUCCH resources identified using a TAG id for the cell group and TAG id for the beam group.

At step 2008, fast PUCCH switching across beams are supported if the beam failure happens on designated beam. PUCCH is released and the PUCCH is re-configured on a different beam.

The gNB may configure PUCCH resources across cells and beam groups:

1) If the PUCCH resources can be supported via large BW on PCell, configure only one PUCCH
2) Else configure multiple PUCCH For the case of 5G systems, beamforming is also supported. The TA values are defined per beam and UE uses these TA values for the transmission on each beam. However, these TA value may not be very different for beams which are spatially QCL'ed in terms of the delay parameter. Hence, the UE 100 can use the same TA value for beams with such spatial QCL and additional TA values are not necessary for the same. Under such cases, the UE need not perform RACH procedure for beams which are QCL'ed with one another and only one RACH procedure is sufficient for the same. Hence, it makes sense to define TAG groups even for the case of beamforming along with the case of carrier aggregation as supported in LTE systems. Hence, the total number of TAG needed for the same can be split into 1) TAG for CA purposes
2) TAG for beamforming purposes.

Beamforming and CA can be performed in conjunction. Hence, different cells may have same beam or different beams. Hence these TAG may be defined within one cell for the case of beamforming or even across cells. These can depend on the UE capability as indicated in the RRC connection setup stage, and the NW implementation of the beams and carrier aggregation.

The MAC PDCU can follow the below formats:—

TABLE 16

| TAG for CA (X bits) | TAG for Beamforming (Y bits) | TA Value |
| --- | --- | --- |

Here, for one cell, say the PCell, the TAG for CA will indicate 00 (if 2 bits are supported) and the TAG for beamforming can indicate 00,01,10,11 (if 2 bits are supported). Hence within a cell group multiple TAG may be defined and multiple PUCCH configurations may exist. In general, if X bits are supported for CA TAG, then $2^X$ TAGs can be supported and similarly for Y bits of TAG for beamforming $2^Y$ timing alignment groups can be supported. Overall $2^{(X+Y)}$ maximum of TAGs can be supported via this design. And the number of TAG used can depend on the network implementation.

Another MAC PDU format could be like:

TABLE 17

| TAG (X + Y bits) | TA Value |
| --- | --- |

In here, the MSBs could correspond to the cells and the LSBs could correspond to the beams.

Per LTE, 32.47us is maximum time difference supported across 2 cells. Hence, the TAG for CA can be defined on such a coarse level of the TA values. These exact values may different in case of 5G deployments, however the motivation can be same. For instance, inter-band carrier aggregation can be supporting larger values of TA.

The TAG for beamforming can be used to indicate finer values of TA within this coarse TA resolution. Such multi-level resolution can be used well with the hybrid beamforming architecture wherein 1 RF chain may be used for the CA TAG and then multiple digital beamforming may be supported in order to support the beamforming TAG. This helps to support UE design as well.

The total number of TAG also depends on the PUCCH design. If the PUCCH design is such that it can carry large payloads, then only 1 PUCCH may be used and all cell feedback may be carrier on the same PUCCH considering that these cells are all within the prescribed time limit for their TA values. However, if PUCCH cannot support such large amounts of feedback, then multiple PUCCH resources are needed and cell groups may be defined for the same. Same design can be extended for the case of beamforming as well wherein PUCCH can be carrier on some designated beam similar to PCell and PUCCH SCell defined in LTE.

A TAG for beamforming can be formed within one TRP or across TRPs etc. They can be formed based on the delay parameters, for instance TA values. For the PRACH procedures performed for any beam within the TAG (defined based on beamforming), then the RAR may be received on same beam or on the designated beam of that TAG. PRACH for any beam inside a TAG will be initiated by PDCCH order.

Overall the design must support PUCCH configuration per cell group and multiple PUCCH configurations per cell group to allow for beamforming. PUCCH configuration for the cell group will define on which cell and beams of which cell the PUCCH will potentially be carried. The PUCCH configuration for the beams will indicate which beams within the cell designated for PUCCH will carry the PUCCH. Hence this is a two level configuration for the PUCCH transmissions. If beam failure happens on the designated beam for the PUCCH, then PUCCH switching must be supported. The figure below shows some configurations for the same.

When beam failure happens on the designated beam, then fast PUCCH switching must be supported i.e., PUCCH release on the designated beam and then re-configure PUCCH on a different beam. This can happen once the gNB receives the beam recovery request from the UE. When the designated beam fails, the UE identifies a candidate beam, and sends recovery request to the gNB. Then gNB can release PUCCH resources on the previous designated beam and then configure the new candidate beam for the PUCCH resources. The below flow chart describes the PUCCH configurations for the CA and beamforming based on TAG.

An aspect of this disclosure provides a method for providing beam management in a User Equipment (UE). The method may comprise: configuring, by a network, one or more beam measurement resources for one or more secondary cells; generating, by the UE, one or more beam measurement results for the one or more beam measurement resources configured by the network, on a secondary cell of the one or more secondary cells; and initiating, by the UE, a beam recovery procedure on the secondary cell, based on one or more predefined conditions associated with the secondary cell.

An aspect of this disclosure provides a method for providing beam management in a User Equipment (UE). The method may comprise: configuring, by a network, one or more beam measurement resources for one or more secondary cells; generating, by the UE, one or more beam measurement results for the one or more beam measurement resources configured by the network on a secondary cell of the one or more secondary cells; and transmitting, by the UE, one or more beam measurement reports corresponding to the secondary cell, by using primary cell resources, wherein the beam measurement reports are transmitted based on one or more predefined conditions.

The one or more predefined conditions comprises: a state when quality of the one or more beam measurement resources associated with the secondary cell is less than a threshold value, wherein the threshold value is one of a threshold value configured by the network or a predefined threshold value.

The one or more predefined conditions comprises: a state when a quality of a beam pair link associated with a predefined control channel of the secondary cell is below a predefined level.

The predefined control channel comprises one of an uplink control channel or a downlink control channel.

An aspect of this disclosure provides a method for providing beam management in a User Equipment (UE). The method may comprise: configuring, by a network, one or more beam measurement resources for one or more secondary cells; generating, by the UE, one or more beam measurement results for the one or more beam measurement resources so configured by the network, on a secondary cell of the one or more secondary cells; and performing, by the UE, a beam recovery on the secondary cell based on a command received from the network, wherein the beam recovery is performed based on an indication provided by the network.

Each beam measurement resource of the one or more beam measurement resources for the secondary cell comprises: a set of reference signal resources comprising at least one of a Synchronization Signal (SS) block indices and channel state information-reference signal (CSI-RS) resource identifiers.

Each beam measurement resource of the one or more beam measurement resources is associated with an identity of the secondary cell, wherein the identity of the secondary cell comprises at least one of a secondary cell index, Absolute Radio Frequency Channel Number (ARFCN), physical cell identity and a secondary cell identity.

The command comprises one of a Physical layer command, or a Medium Access Control (MAC) layer command, wherein the command is provided using one of a primary cell (PCell) downlink control channel, or a secondary cell (SCell) downlink control channel.

Each of the physical layer command and the MAC layer command contains an identity of the secondary cell, wherein the identity of the secondary cell comprises at least one of a secondary cell index, an Absolute Radio Frequency Channel Number (ARFCN), a physical cell identity, a secondary cell identity, and a channel state information-reference signal (CSI-RS) resource identifier.

The configuring by the network, comprises providing, the UE with an independent Physical Downlink Control Channel (PDCCH) configuration, wherein the independent PDCCH configuration comprises at least one of a user specific PDCCH search space (USS), and a common PDCCH search space (CSS) for multiple beams of a cell.

The independent PDCCH configuration is provided for one of a per beam or per beam group for UE.

The independent PDCCH configuration is associated with at least one of common parameters for all beams of a cell and uncommon parameters, wherein the common parameters comprises one of a time periodicity for one of a USS or a CSS, or a coding scheme, wherein the uncommon parameters in the independent PDCCH configuration comprises one of a time offset, a frequency location, and wherein the uncommon parameters are provided for one of a per beam or per beam group to the UE.

The uncommon parameters are determined based on one or more determination parameters associated with the beam where the UE monitors downlink control channel, wherein the one or more determination parameters comprises one of a Synchronization Signal (SS) block index, or a CSI-RS resource identifier.

The UE configured by the network is indicated with a location of a PDCCH, wherein the location comprises a bandwidth part.

The PDCCH configuration to be used by the UE is indicated by using one of a Physical layer command or a MAC command.

The configuring, by the network, comprises: providing, the UE, with a Physical Uplink Control Channel (PUCCH) resources for multiple beams, wherein the PUCCH resources are provided by using one of an RRC signaling, or a system information.

The PUCCH resources for the multiple beams comprises an independent PUCCH configuration for one of a per beam for the UE or per beam group for the UE.

The independent PUCCH configuration comprises one of common parameters for all beams in the cell or uncommon parameters for one of the per beam of the UE or per beam group of the UE, wherein the common parameters comprises one of a time periodicity of PUCCH, or a coding scheme, and wherein the uncommon parameters comprises one of a time offset, frequency location.

The uncommon parameters are determined based on one or more determination parameters associated with the beam where the UE, transmit PUCCH resources, wherein the one or more determination parameters comprises one of a SS block index, or channel state information-reference signal (CSI-RS) resource identifier.

The PUCCH configuration to be used by the UE is indicated by using one of a Physical layer or a MAC command.

The PUCCH resources comprises one of a PUCCH resources for a Primary cell, or PUCCH resources for the secondary cell, wherein each of the PUCCH resources for the Primary cell, and the PUCCH resources for the secondary cell is configured as one of a periodic transmission, aperiodic transmission, or a one-shot transmission.

The PUCCH resources configured as the periodic transmission are provided by the network by using an RRC configuration, wherein the PUCCH resources configured for the aperiodic transmission are configured by the network by using dedicated RRC configuration while activating the PUCCH resources by using one of a layer-1 signaling, or a MAC CE signaling including PUCCH resource identity.

A time duration for activating the PUCCH resources for the aperiodic transmission is configured after receiving an activation message and by using a dedicated RRC configuration.

The method may further comprise: determining, by the UE, multiple beam management groups based on one of an explicit configuration of a beam management group provided by the network or an implicit information of configuration of the secondary cell, wherein each beam management group of the multiple beam management groups consists of cells using a same pair for each of an uplink transmission and a downlink transmission, wherein each of the beam management group is associated with a beam management group identity.

Each of the beam management group comprises a network configured PUCCH Cell Group, wherein the network configured PUCCH cell group comprises beams and cells sharing a same PUCCH resource.

The determination of the multiple beam management groups is based on one of an explicit configuration of a beam management cell group by using one of a UE specific RRC configuration, system information, MAC CE signaling, PHYSICAL layer signaling, OR MAC LAYER signaling.

The explicit configuration of the beam management cell group is provided by the network by providing a mapping between each cell and each beam management group identity.

Each beam management group of the multiple beam management groups comprises a network configured Timing Alignment Group (TAG), wherein each of beams and cells in the TAG shares a same time alignment value.

Each of the beam management group is defined based on a Quasi co-located (QCL) information.

The QCL information enables the network to indicate about carrier frequencies spatially aligned with each frequency configured for the UE.

The QCL information is provided as one of an RRC configuration, a system information, a MAC CE signaling, the Physical layer signaling, or is pre-defined.

The UE is configured to group QCL frequencies in a similar frequency group identified by a QCL identifier.

The beam management group identity is defined as a QCL identifier.

The UE receives a message from the network for performing one of a change the beam, or select the beam, associated with one of a downlink control channel or an uplink control channel.

The message includes a new beam identity to be used for each of the downlink control channel, the uplink control channel, or transmissions, wherein the message comprises one of a cell index or a beam management group identity.

The UE applies one or more indicated beams for all cells belonging to an indicated beam management group based on a reception of the beam management group identity.

The UE applies one or more indicated beams for all cells belonging to a beam management group associated with the cell for which the cell index is indicated in the message.

An aspect of this disclosure provides a method for providing beam recovery in a User Equipment (UE). The method may comprise: configuring, by a network for the UE, a beam recovery request resource associated with one or more secondary cells; transmitting, by the UE, a beam recovery request by using the beam recovery request resource configured, on a cell where beam recovery is triggered, wherein the beam recovery request comprises an identity of a candidate beam of a secondary cell of the cell; selecting, by the UE, one or more beams, for transmission of the beam recovery request to the network; monitoring, by the UE, a beam recovery response from the network, for a monitoring time duration, on a predefined response resource; and performing, by the UE, a predefined action, based on a reception of the beam recovery response, wherein the predefined action is performed according to the monitoring time duration.

The beam recovery request resource comprises one of a primary cell (PCell) resource, or a secondary cell (SCell) resource.

The SCell resource is associated with an identity of the secondary cell, wherein the identity of the secondary cell comprises at least one of a secondary cell index, an Absolute Radio Frequency Channel Number (ARFCN), a physical cell identity, and a secondary cell identity.

The PCell resource comprises at least one of a PUCCH, Physical Uplink Shared Channel (PUSCH), and a Random-Access Channel (RACH).

An identity of a candidate beam(s) of the Secondary Cell resource comprises one of a SS block index or a channel state information-reference signal (CSI-RS) resource index.

A Secondary Cell identity of the SCell is indicated to the network by using one of an implicit method or by a method explicitly including a Secondary Cell information in the beam recovery request.

The implicit method comprises a method using an uplink resources configured for a specific SCell.

The method explicitly may comprise including the Secondary Cell information in the beam recovery request comprises one of a cell index, a physical cell identity, a carrier information of the SCell, a beam group identity of the candidate beam, or a channel state information-reference signal (CSI-RS) resource identity of the candidate beam.

The beam recovery request further comprises a UE identity when contention-based resources are used for the transmission of the beam recovery request.

The predefined response resources comprises one of a primary cell (PCell) resources, or a secondary cell (SCell) resources.

The PCell resources for receiving the beam recovery response comprises beam links associated with downlink control channel resources of the PCell.

The monitoring time duration is one of a predefined time duration, or a time duration configured by the network by using one of a dedicated RRC configuration or provided in system information.

The beam recovery response comprises one of a rejection message, or an acceptance message, wherein the acceptance message is received when the beam recovery response is received before an expiration of the monitoring time duration.

The beam recovery response indicates one of an identity of the SCell as one of an explicit identity, or an implicit identity, wherein the explicit identity comprises one of a physical cell identity, a SCell index, a carrier information of the SCell, a beam group identity of candidate beam, or a channel state information-reference signal (CSI-RS) resource identity of the candidate beam, wherein the implicit identity is indicated by using a SCell specific downlink control channel.

The predefined action comprises stop performing the beam recovery request transmission for the SCell and triggering a beam failure, wherein the beam failure is triggered in case the beam recovery response is received as one of the rejection message or a message received after the expiration of the monitoring time duration.

The UE performs the predefined action of processing an uplink grant received in the beam recovery response message in case the beam recovery response is the acceptance message.

The UE performs the predefined action of starting a monitoring of beam link indicated in the beam recovery response message in case the beam recovery response is the acceptance message.

The method may further comprise: triggering, by the UE, a beam failure, in case a number of beam recovery attempts performed by the UE is one of a number greater than a threshold, or a number equal to the threshold, wherein the threshold is one of a predefined threshold, or a threshold configured by the network by using one of a dedicated RRC configuration or a system information.

The method may further comprise: performing, by the UE, a retransmission of the beam recovery request, wherein the retransmission is followed by each of the monitoring, and the performing of the predefined action by the UE.

The beam recovery request resource of the one or more SCells comprises one of a PUCCH or a RACH.

The selecting the one or more beam comprises:

1) selecting, by the UE, N beams of one of a PCell or a SCell based on quality of one of a channel state information-reference signal (CSI-RS) or SS transmission, wherein N in the N beams comprises one of a predefined in specification, configured by the network using one of a dedicated RRC configuration, a system information, or N is a UE implementation specific.

The method may further comprise: selecting, the beam recovery request resource for transmitting the beam recovery request based on a predefined selection criterion.

The predefined selection criterion provides a configuration of the UE by the network for transmitting the beam recovery request by using one of a PCell resource or a SCell resource, wherein the configuration is provided by using one of a dedicated RRC configuration, a system information, MAC CE signaling or a Physical layer signaling.

The monitoring of the beam recovery response from the network is performed on each of a PCell resource and a SCell resource.

The monitoring on the PCell is performed if the beam recovery request is transmitted using the PCell resource.

The monitoring on the SCell is performed if the beam recovery request is transmitted using the SCell resource.

The predefined action further comprises one of a stopping transmission of any uplink transmissions on the SCell, releasing all uplink control channel resources on the SCell, stopping monitoring a beam link associated with downlink control channel of SCell, sending by the UE an indication to higher layers (RRC) of beam failure on SCell, or sending by the UE one of a Physical layer or MAC message to the network by using PCell resources indicating beam failure of the SCell along with each of an identity of the SCell and a best candidate beam of the SCell and quality of beams.

The method may further comprise: initiating, by the UE, an RRC timer when the higher layers (RRC) receives the indication of beam failure, wherein a timer length of the RRC timer is configured by one of a dedicated RRC configuration or by a system information.

The UE stops the RRC timer while resuming each of the SCell resources and transmissions in case the UE receives an indication from a lower layer indicating a successful completion of the beam recovery request on the SCell.

The UE releases SCell autonomously after an expiry of the RRC timer.

The UE sends one of an RRC message, a Physical Layer message or a MAC Layer message to the network indicating each of a release of the SCell along with an identity of the SCell and available measurement results of the SCell after an expiry of the RRC timer.

The UE sends one of an RRC message, a Physical Layer message or a MAC Layer message to the network indicating the beam failure on each of the SCell along with an identity of SCell and available measurement results of the SCell after an expiry of the RRC timer.

The embodiments disclosed herein can be implemented through at least one software program running on at least one hardware device and performing network management functions to control the elements. The elements shown in FIGS. 1-20 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method for providing beam recovery in a user equipment (UE), the method comprising:
    transmitting, by the UE, a beam recovery request by using a beam recovery request resource associated with one or more secondary cells, on a secondary cell among the one or more secondary cells, where a beam recovery process is triggered, wherein the beam recovery request comprises an identity of a candidate beam of the secondary cell;
    identifying whether a resource of a beam recovery response to be received in response to the beam recovery request is one of a primary cell downlink resource or a secondary cell downlink resource;
    monitoring, by the UE, the beam recovery response from a network, for a monitoring time duration, on the identified resource and receiving the beam recovery response; and
    performing, by the UE, a predefined action comprising processing of an uplink grant received in the beam recovery response in response to receiving the beam recovery response, wherein the predefined action is performed according to the monitoring time duration,
    wherein the beam recovery response comprises one of a rejection message or an acceptance message,
    wherein the acceptance message is received when the beam recovery response is received before an expiration of the monitoring time duration, and
    wherein the beam recovery request resource associated with the one or more secondary cells are configured by the network for the UE.

2. The method as claimed in claim 1, wherein the beam recovery request resource comprises one of a primary cell resource, or a secondary cell resource.

3. The method as claimed in claim 2, wherein the secondary cell resource is associated with an identity of the secondary cell, and
wherein the identity of the secondary cell comprises at least one of a secondary cell index, an absolute radio frequency channel number (ARFCN), a physical cell identity, or a secondary cell identity.

4. The method as claimed in claim 2, wherein the primary cell resource comprises at least one of a physical uplink control channel (PUCCH), a physical uplink shared channel (PUSCH), or a random-access channel (RACH).

5. The method as claimed in claim 1, wherein the identity of the candidate beam of the secondary cell comprises one of a synchronization signal (SS) block index or a channel state information-reference signal (CSI-RS) resource index.

6. The method as claimed in claim 3, wherein the identity of the secondary cell is indicated to the network by using one of a first method or by a second method including secondary cell information in the beam recovery request.

7. The method as claimed in claim 6, wherein the first method comprises a method using uplink resources configured for a specific secondary cell.

8. The method as claimed in claim 6, wherein the secondary cell information in the beam recovery request comprises one of a cell index, a physical cell identity, a carrier information of the secondary cell, a beam group identity of the candidate beam, or a channel state information-reference signal (CSI-RS) resource identity of the candidate beam.

9. The method as claimed in claim 1, wherein the beam recovery request further comprises a UE identity in case that contention-based resources are used for the transmission of the beam recovery request.

10. The method as claimed in claim 1, wherein the primary cell downlink resources comprises beam links associated with downlink control channel resources of a primary cell.

11. The method as claimed in claim 1, wherein the monitoring time duration is one of a predefined time duration, or a time duration that is configured by the network by using one of a dedicated radio resource control (RRC) configuration or system information.

12. A user equipment (UE) for providing beam recovery in a cellular network, the UE comprising:
a transceiver; and
at least one processor coupled to the transceiver and configured to:
control the transceiver to transmit a beam recovery request by using a beam recovery request resource associated with one or more secondary cells, on a secondary cell among the one or more secondary cells, where a beam recovery process is triggered, wherein the beam recovery request comprises an identity of a candidate beam of the secondary cell,
identify whether a resource of a beam recovery response to be received in response to the beam recovery request is one of a primary cell downlink resource or a secondary cell downlink resource,
monitor the beam recovery response from a network, for a monitoring time duration, on the identified resource and receive the beam recovery response, and
perform a predefined action comprising processing of an uplink grant received in the beam recovery response in response to receiving the beam recovery response,
wherein the predefined action is performed according to the monitoring time duration,
wherein the beam recovery response comprises one of a rejection message or an acceptance message,
wherein the acceptance message is received when the beam recovery response is received before an expiration of the monitoring time duration, and
wherein the beam recovery request resource associated with the one or more secondary cells are configured by the network for the UE.

13. The UE as claimed in claim 12, wherein the beam recovery request resource comprises one of a primary cell resource or a secondary cell resource.

14. The UE as claimed in claim 12, wherein the identity of the candidate beam of the secondary cell comprises one of a synchronization signal (SS) block index or a channel state information-reference signal (CSI-RS) resource index.

15. The UE as claimed in claim 12, wherein the beam recovery request further comprises a UE identity in case that contention-based resources are used for the transmission of the beam recovery request.

* * * * *